(12) United States Patent
Mansfield

(10) Patent No.: US 7,970,579 B2
(45) Date of Patent: Jun. 28, 2011

(54) APPARATUS FOR AND A METHOD OF DETERMINING SURFACE CHARACTERISTICS

(75) Inventor: Daniel Ian Mansfield, Leicester (GB)

(73) Assignee: Taylor Hobson Limited, Leicester (GB)

( * ) Notice: Subject to any disclaimer, the term of this patent is extended or adjusted under 35 U.S.C. 154(b) by 352 days.

(21) Appl. No.: 12/094,733

(22) PCT Filed: Nov. 22, 2006

(86) PCT No.: PCT/GB2006/004391
§ 371 (c)(1),
(2), (4) Date: Oct. 1, 2008

(87) PCT Pub. No.: WO2007/060441
PCT Pub. Date: May 31, 2007

(65) Prior Publication Data
US 2010/0161273 A1    Jun. 24, 2010

(30) Foreign Application Priority Data
Nov. 22, 2005   (GB) .................................. 0523722.7

(51) Int. Cl.
G06F 15/00 (2006.01)
G01B 11/24 (2006.01)
(52) U.S. Cl. ...................................................... 702/167
(58) Field of Classification Search .................. 702/167, 702/183; 356/511, 512
See application file for complete search history.

(56) References Cited

U.S. PATENT DOCUMENTS
2002/0196450 A1   12/2002   Olszak et al.
2006/0018514 A1*   1/2006   Bankhead ..................... 382/108

FOREIGN PATENT DOCUMENTS
WO    WO 03/078925    9/2003
WO    WO 2004/023071    3/2004

OTHER PUBLICATIONS
International Search Report for International Application PCT/GB2006/004391; Completed Feb. 16, 2007 and Mailed Feb. 26, 2007.

* cited by examiner

Primary Examiner — Bryan Bui
(74) Attorney, Agent, or Firm — RatnerPrestia

(57) ABSTRACT

A coherence scanning interferometer (2) carries out: a coherence scanning measurement operation on a surface area (81) carrying a structure using a low numeric aperture objective so that the pitch of the surface structure elements (82) is much less that the spread of the point spread function at the surface (7) to obtain structure surface intensity data; and a coherence scanning measurement operation on a non-structure surface area (83), which may be part of the same sample or a different sample, to obtain non-structure surface intensity data. A frequency transform ratio determiner (105) determines a frequency transform ratio (the HCF function) related to the ratio between the structure surface intensity data and the non-structure surface intensity data. A structure provider (109) sets that frequency transform ratio equal to an expression which represents the electric field at the image plane of the coherence scanning interferometer in terms of surface structure element size (height or depth) and width-to-pitch ratio and derives the surface structure element size and width-to-pitch ratio using the frequency transform ratio. The structure provider (109) may also extract the surface structure element width, if the pitch is independently known.

33 Claims, 17 Drawing Sheets

APPARATUS FOR AND A METHOD OF DETERMINING SURFACE CHARACTERISTICS

CROSS REFERENCE TO RELATED APPLICATIONS

This application is a U.S. National Phase Application of PCT International Application PCT/GB2006/004391, filed Nov. 22, 2006. This application claims priority of GB 0523722.7, filed Nov. 22, 2005 and is incorporated herein in its entirety.

This invention relates to apparatus for and a method of determining surface characteristics of a surface where the surface topography includes surface structure elements such as trenches, grooves, walls, vias, or mesas.

BACKGROUND

One field in which a substrate or sample may have a surface topography that includes surface structure elements is the semiconductor field. For example, an array of grooves or trenches may be formed in the surface of a semiconductor' substrate by etching to provide locations at which isolation material may be provided to isolate different device structures of the same substrate. As another possibility, an array of grooves or trenches may be etched into a substrate to define gate structures of for example a non-planar insulated gate field effect device or to define a recessed gate junction field effect device. Such an array of grooves or trenches may have, for example, an array pitch of a few micrometres, a submicron trench width, and a trench depth that lies in the range of 0.1 to 10 micrometres. As another possibility, device structures may be formed in walls or mesas provided on a surface. The properties of the resulting devices may be determined at least in part by the array pitch and the widths and depths/heights of such surface structure elements and it is desirable to be able to check that the surface structure elements once formed are of the width and depth required for the device specification.

One way of determining the width and height or depth of such surface structure elements is by cleaving a number of samples through a groove or trench to produce cross-section samples and then examining those cross-section samples using scanning electron microscopy (SEM). This is, however, inevitably a destructive testing process.

SUMMARY

In one aspect, the present invention provides apparatus for and a method of determining information relating to width and size transverse to the surface (height or depth) of surface structure elements, or width of a surface structure element, in a non-destructive manner using coherence scanning or broadband scanning interferometry (sometimes called "white-light scanning interferometry" or "scanning white light interferometry") which is discussed in, for example, a paper entitled "Profilometry with a Coherence Scanning Microscope" by Byron S. Lee and Timothy C Strand published in Applied Optics Volume 29, No. 26 10 Sep. 1990 at pages 3784 to 3788.

An embodiment of the invention provides apparatus and a method that: carry out a coherence scanning measurement operation on a surface area carrying the structure using a low numeric aperture objective (so that the pitch of the surface structure elements is much less that the spread of the point spread function at the surface) to obtain structure surface intensity data; carry out a coherence scanning measurement operation on a non-structure surface area (which may be part of the same sample or a different sample) using the same low numeric aperture objective to obtain non-structure surface intensity data; set a frequency transform ratio related to the ratio between the structure surface intensity data and the non-structure surface intensity data (in the example described above the ratio of the positive frequency space sidebands of the Fourier transforms) equal to an expression which represents the electric field at the image plane of the interferometer system in terms of surface structure element size (height or depth) and width-to-pitch ratio; and then derive the surface structure element size and width-to-pitch ratio using the frequency transform ratio, and possibly also extract the surface structure element width, if the pitch is independently known.

In an embodiment, a coherence scanning interferometer carries out: i) a coherence scanning measurement operation on a surface area carrying a structure using a low numeric aperture objective so that the pitch of the surface structure elements is much less that the spread of the point spread function at the surface to obtain structure surface intensity data; and ii) a coherence scanning measurement operation on a non-structure surface area, which may be part of the same sample or a different sample, to obtain non-structure surface intensity data. A frequency transform ratio determiner determines a frequency transform ratio related to the ratio between the structure surface intensity data and the non-structure surface intensity data. A structure provider sets that frequency transform ratio equal to an expression which represents the electric field at the image plane of the coherence scanning interferometer in terms of surface structure element size (height or depth) and width-to-pitch ratio and derives the surface structure element size and width-to-pitch ratio using the frequency transform ratio. The structure provider may also extract the surface structure element width, if the pitch is independently known.

BRIEF DESCRIPTION OF THE DRAWINGS

Embodiments of the present invention will now be described, by way of example, with reference to the accompanying drawings, in which.

DETAILED DESCRIPTION

Figure 1:
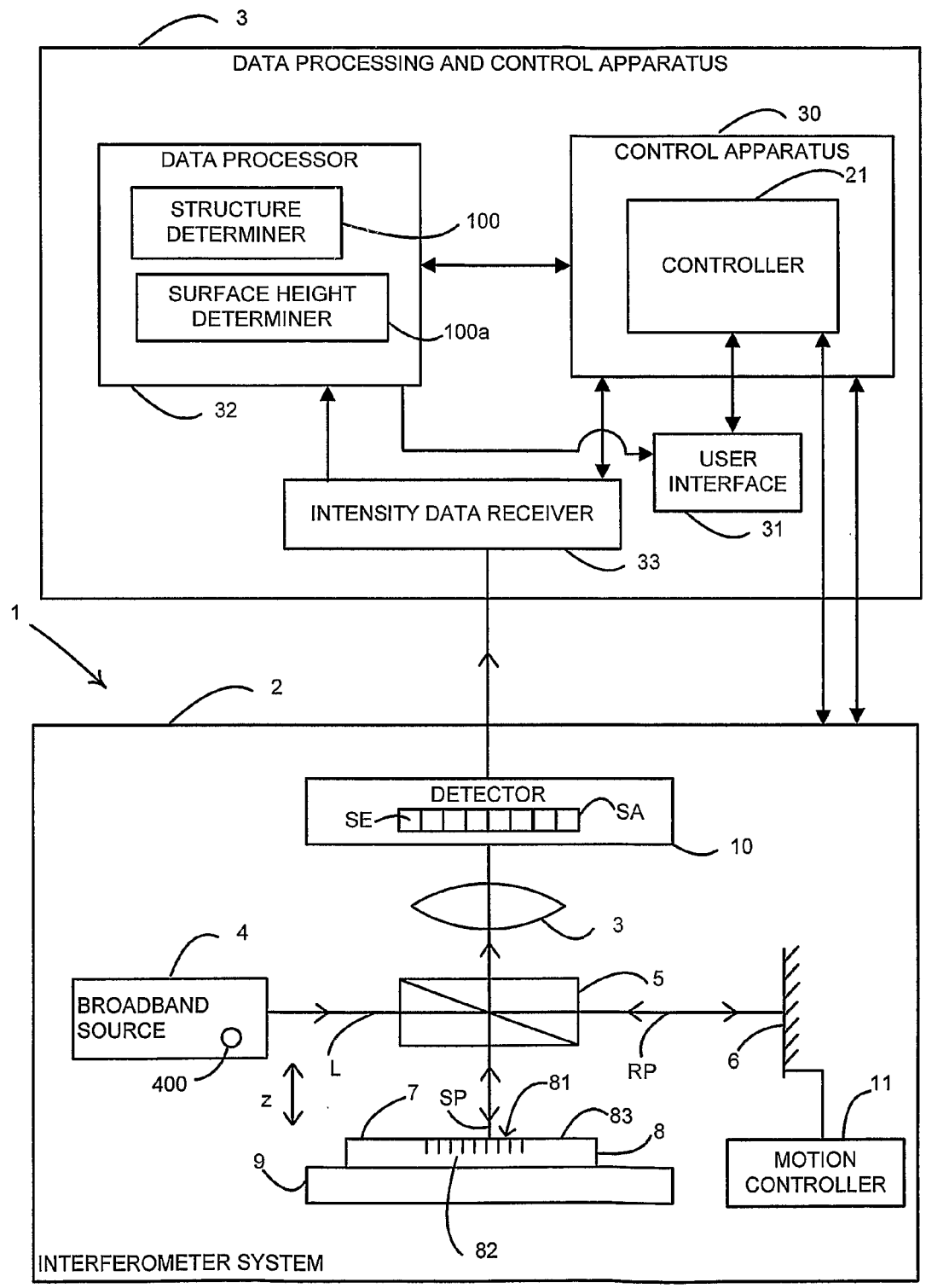
FIG. 1 shows a schematic block diagram of apparatus for determining surface characteristics, the apparatus comprising an interferometer system and a data processing and control apparatus.

Referring now the drawings, FIG. 1 shows a simplified schematic block diagram of apparatus 1 for determining surface characteristics of a substrate or other body having at least one surface structure element, for example for determining surface characteristics of a substrate or other body where the surface includes a plurality of surface structure elements arranged so as to have a given surface structure element-to-surface structure element pitch, where the surface structure elements project from or are recessed into the sample surface. Examples of surface structure elements are trenches, grooves, vias and mesas. Such surface structure elements may have a size (height or depth) that lies in the range 0.1 to 10 micrometres and, where an array of such surface structure elements is present, may have an array pitch of a few micrometres and a sub-micron surface structure element width. The sample may be, for example, a semiconductor body having a surface provided with the surface structure elements by etching and/or deposition.

As will be described below, apparatus embodying the invention is operable: to carry out a coherence scanning measurement operation on a surface area 81 carrying the structure using a low numeric aperture objective (so that the pitch of the surface structure elements 82 is much less that the spread of the point spread function at the surface 7) to obtain structure surface intensity data; to carry out a coherence scanning measurement operation on a non-structure surface area 83 (which may be part of the same sample or a different sample) using the same low numeric aperture objective to obtain non-structure surface intensity data; to set a frequency transform ratio (in this example the "HCF function") related to the ratio between the structure surface intensity data and the non-structure surface intensity data (in an example the ratio of the positive frequency space sidebands of the Fourier transforms) equal to an expression which represents the electric field (in an example represents the conjugate of the electric field) at the image plane of the interferometer system in terms of surface structure element size (height or depth) and width-to-pitch ratio; and then to derive the surface structure element size and width-to-pitch ratio using the frequency transform ratio without the need for destructive testing. The apparatus may also extract the surface structure element width, if the pitch is independently known.

Referring now to the drawings in detail, the apparatus 1 shown in FIG. 1 has a broadband or coherence scanning interferometer system 2 and data processing and control apparatus 3.

The broadband scanning interferometer system 2 is based on a conventional interferometer and, typically, may have a Mirau, Michelson or Linnik configuration, for example. As discussed in the introduction, instead of having a monochromatic spatially coherent light source, the broadband scanning interferometer system 2 has a broadband source 4 which may be, for example, a white light source such as a quartz halogen lamp coupled to a regulated DC power supply having a light intensity output user control 400 provided, for example, in the form of a user-rotatable knob.

The broadband source 4 provides broadband light L which is split by a beam splitter (illustrated in FIG. 1 as a single beam splitting prism) 5 into a first light beam which is directed along a reference path RP towards a reference mirror 6 and a second light beam which is directed along a sample path SP towards a surface 7 of a sample 8 mounted on a sample support stage 9. Light reflected from the reference mirror 6 returns along the reference path RP to the beam splitter 5 where it interferes with light reflected from the sample surface 7 back along the sample path SP. A focussing element 3 is provided to focus an image of the region of interference onto a detector 10.

In this embodiment, the detector 10 has a 2D (two-dimensional) array SA of image sensing elements SE, one row of which is shown very diagrammatically in FIG. 1. The array SA images an area of the sample surface 7 falling within the field of view of the detector 10. Each individual sensing element SE of the 2D sensing array of the detector 10 detects the portion of the interference pattern falling within the acceptance cone of that element and resulting from a corresponding surface region or surface pixel of the area of the sample surface 7 so that, effectively, the imaged area of the surface can be considered as a 2D array of surface regions or surface pixels. In this example, the detector 10 is a CCD (Charge Coupled Device) digital camera, for example, a Vosskuhler GmbH: CCD 1300 CCD digital camera. As another possibility, a CMOS detector having a 2D (two-dimensional) xy array of CMOS sensing elements may be used. In either case, generally each of the sensing elements is square to provide the same resolution in both directions (x and y) of the array. The sensing elements may have dimensions of several micrometres, for example the sensing elements may have dimensions lying in the range 5 to 10 micrometres.

A motion controller 11 is provided to effect relative movement between the sample 8 and the reference mirror 6 so as to change the difference between the lengths of the paths traveled by light reflected from the reference mirror 6 and light reflected from the sample surface 7. As shown in FIG. 1, the motion controller 11 is arranged to move the reference mirror 6 and objective lens combination along the reference path RP (see FIG. 3 because, for simplicity, FIG. 1 shows the motion controller simply coupled to the reference mirror 6). This is equivalent to moving the sample surface 7 along a scan path in the Z direction shown in FIG. 1. As another possibility, the sample stage 9 may be movable along the scan path or both the sample stage 9 and the reference mirror 6 and objective lens combination may be movable to effect movement along the scan path.

The detector 10 is arranged to capture or sense light intensity (i.e. the interference pattern) at intervals as the path length difference between the sample 8 and the reference mirror 6 is changed. In this example, the detector captures or senses the light intensity at intervals corresponding to changes in the relative position of the sample 8 along the scan path (the optical axis) of $\Delta z_{step} = \lambda/8$, where $\lambda$ is the nominal mean wavelength of the broadband source and the step is typically 75 nm. Other scan steps are possible. 2D image or frame data representing the intensity pattern for the field of view of the detector 10 is acquired by the detector 10 at each interval.

Figure 2:
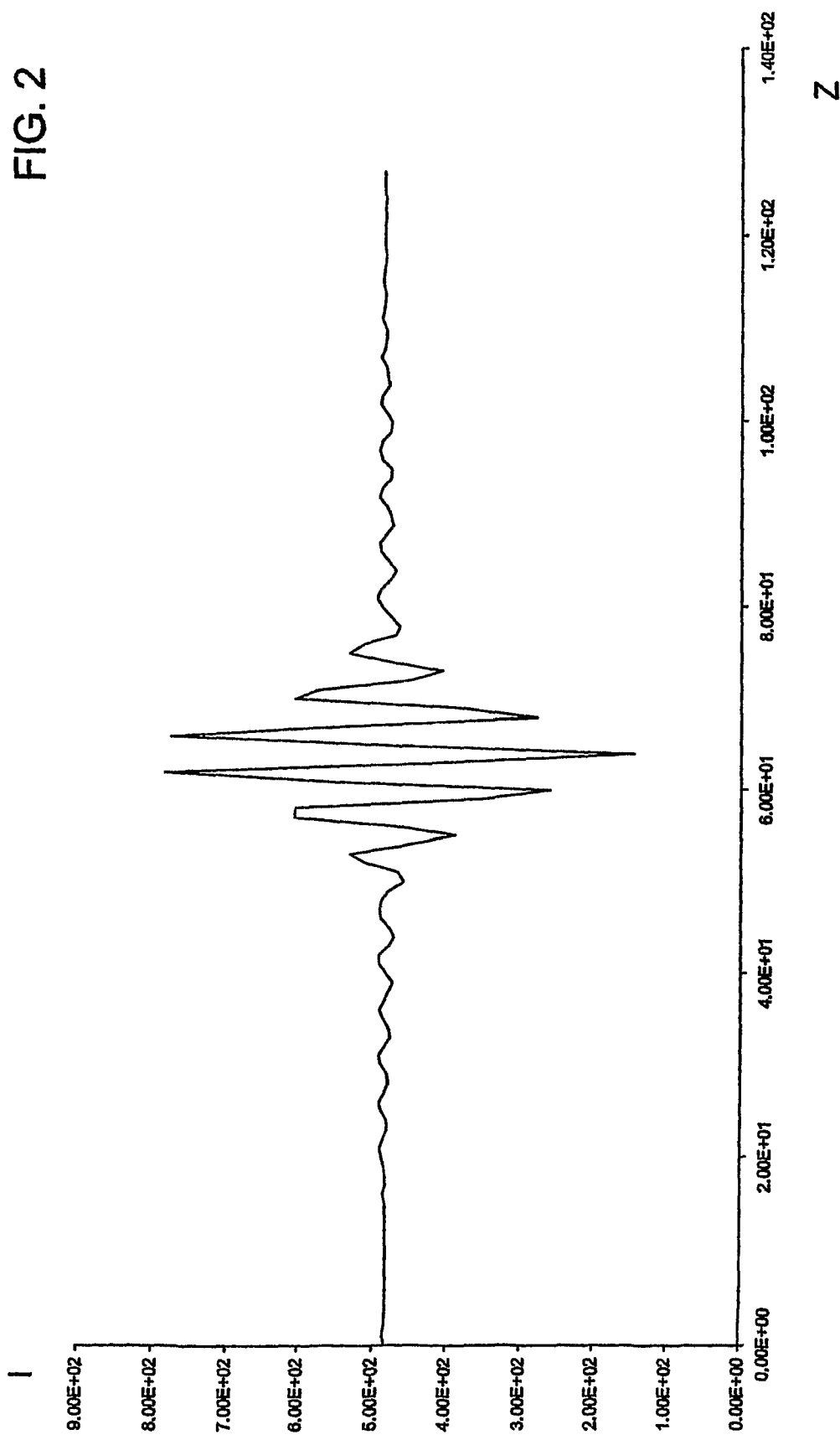
FIG. 2 shows a graph of intensity I against position Z to illustrate a typical example of the interference fringes for a sample surface region around a coherence peak or interference region.

The intensity of the illumination sensed by one sensing element of the 2D sensing array (that is the portion of the interference pattern provided by light reflected from the corresponding surface region or surface pixel of the sample surface 7 imaged on that sensing element) varies as the path length difference changes with movement of the reference mirror 6, resulting in a series of fringes which have a coherence peak at the position along the scan path corresponding to zero path length difference. FIG. 2 shows a graph of light intensity against position Z to illustrate the manner in which the intensity of the light sensed by a sensing element of the 2D sensing array of the detector 10 (and thus the interference fringe region) changes as the relative positions of the reference mirror 6 and sample surface 7 change. The envelope of the intensity distribution is the Fourier transform of the spectral distribution of the broadband source, modified by the spectral transmission of the instrument together with the spectral responsivity of the detector.

Further details of one example of an interferometer system 2 that may be used in the apparatus 1 will now be described with the aid of FIG. 3 which shows an overall functional block diagram of the apparatus 1 and FIG. 4 which shows a simplified side elevational view of the interferometer system 2.

Figure 3:
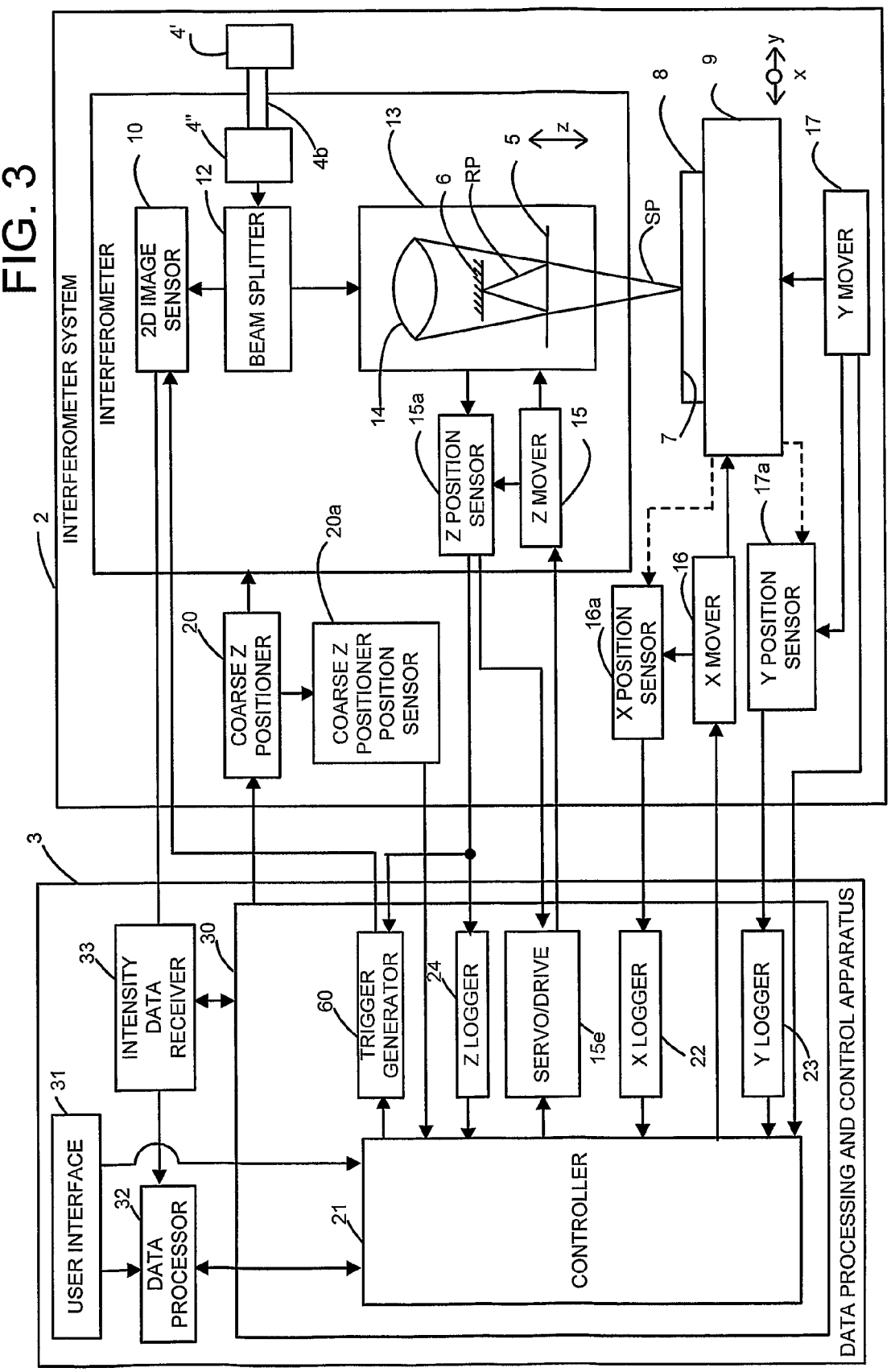
FIG. 3 shows a functional block diagram illustrating in greater detail one example of the apparatus shown in FIG. 1.
Figure 4:
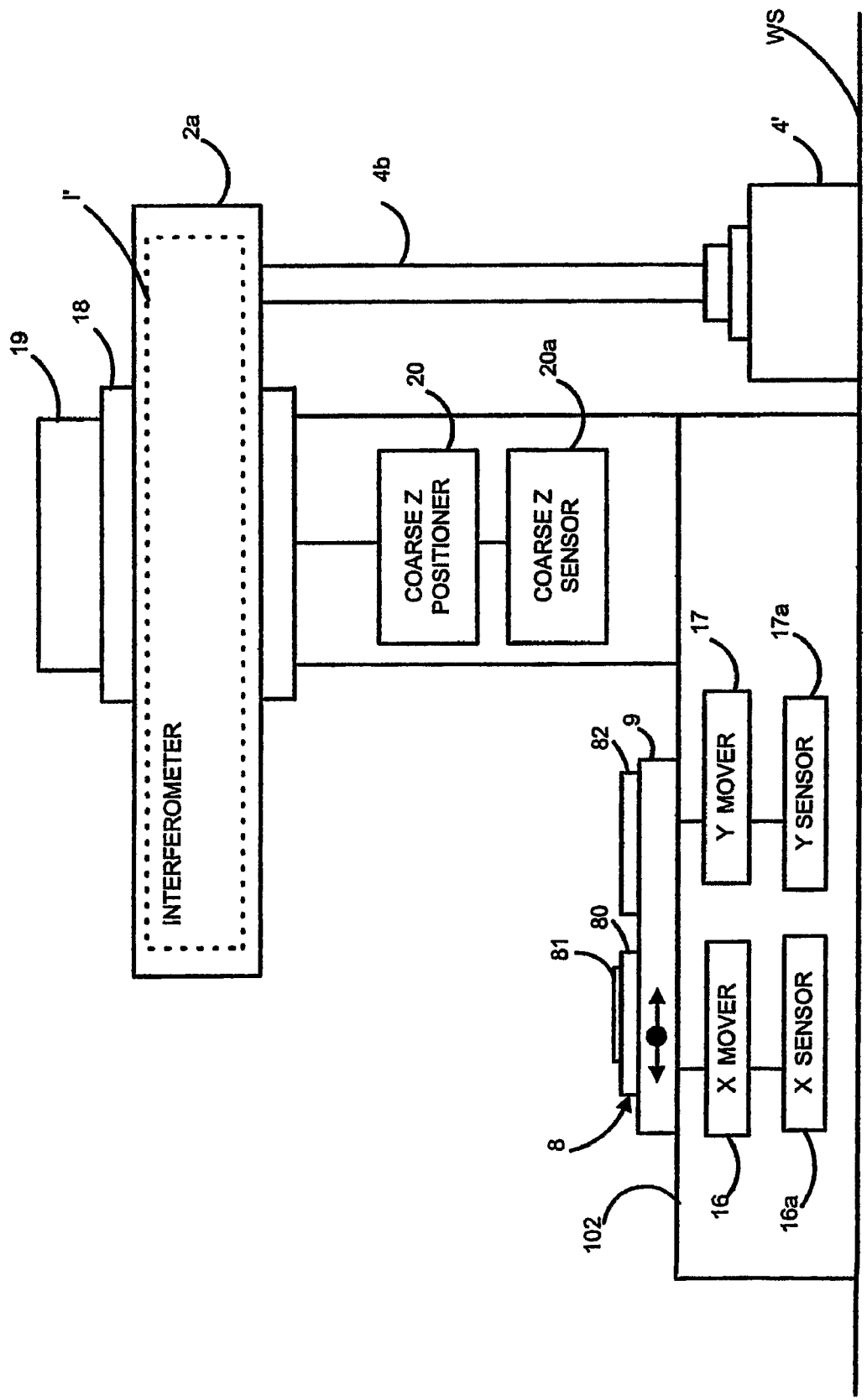
FIG. 4 shows a simplified side-elevational, part sectional view of one example of a suitable interferometer system for use in the apparatus.

In the example shown in FIGS. 3 and 4, the interferometer system 2 is based on a Mirau type interferometer.

As shown in FIG. 3, an interferometer I of the broadband scanning interferometer system 2 has a broadband source 4 having first and second components 4' and 4" optically coupled by an optical fibre cable 4b. The first component 4' houses a quartz halogen projector bulb (with associated reflector) or broadband LED (Light Emitting Device). The second component comprises a series of optical elements through which light from the optical fibre cable 4b is transmitted. In this example, the series consists of a diffuser, a changeable filter, an aperture stop, a lens, a field stop and a collimating lens that provides an emergent light beam L. The filter may be a neutral density filter or a band pass filter, designed to restrict the wavelength range of the light emitted by the broadband source 4, such as a Helium-Neon laser line filter designed to pass light having a Helium-Neon laser line wavelength.

The second component 4" of the broadband light source is arranged to supply broadband light L via a beam splitter 12 to an objective lens assembly 13 which includes, in addition to an objective lens 14, the beam splitter 5 and the reference mirror 6. The beam splitter 5 splits the light beam provided by the beam splitter 12 into a first reference beam that is directed along the reference path RP and a second sample beam that is directed along the sample path SP from the interferometer I towards the surface 7 of the sample 8 mounted on the sample support stage 9. Light returned to the beam splitter 12 is reflected towards the detector by the beam splitter and focussed onto the detector 10 by lens 3 (see FIG. 1).

The objective lens assembly 13, and thus the reference mirror 6, is movable in the Z direction by a Z direction mover 15 (in this example a piezoelectric mover although a suitable motor may be used), under the control of servo/drive circuitry 15e of the control apparatus 30. The sample support stage 9 is movable in X and Y directions by an X mover 16 and a Y mover 17, respectively, to enable different areas of the sample surface 7 to be brought within the field of view of the detector 10.

As shown in FIG. 4, the majority I' of the components of the interferometer I of the broadband scanning interferometer system 2 (apart from first component 4' of the light source and the optical fibre cable 4b) are provided within a housing 2a mounted via a carriage 18 to a Z axis datum column 19. The carriage 18 is coupled via a drive mechanism (not shown) such as a ball screw or lead screw drive mechanism to a coarse Z positioner 20 in the form of a manually operable control or, in this example, a DC motor that enables the carriage 18 and thus the interferometer I to be moved up and down the column 19 in the Z direction to enable the interferometer to be moved to different scanning start positions.

As shown in FIG. 4, the sample support stage 9 is provided on a support 102 which houses the X and Y movers 16 and 17. The X and Y movers 16 and 17 comprise, in this example, DC motors coupled to the sample support stage 9 by appropriate conventional drive mechanisms such as rack and pinion or ball screw drive mechanisms (not shown). Other suitable movers may be used. As shown in FIGS. 3 and 4, each of the Z, X and Y movers is associated with a corresponding position sensor 15a, 16a and 17a while the coarse Z positioner 20 may be associated with a coarse Z positioner position sensor 20a. The dashed lines between the support stage 9 and the X and Y position sensors 16a and 17a in FIG. 3 indicate that the position sensors may sense movement of the support stage 9 directly, rather than by signals derived from the corresponding motor.

As shown in FIG. 1, the data processing and control apparatus 3 has control apparatus 30 for controlling operation of the interferometer system 2, an intensity data receiver 33 for receiving intensity data signals from the detector 10, a data processor 32 for processing the intensity data under the control of a controller 21 of the control apparatus 30 and a user interface 31 for enabling a user or operator to control operation of apparatus, for enabling the user or operator to be provided with a data output representing the results of processing by the data processor 32 of the data acquired during a measurement operation and also for enabling messages such as error messages to be communicated to the user.

The controller 21 of the control apparatus 30 controls overall operation of the apparatus and communicates with the user interface 31 and data processor 32. The control apparatus 30 also includes, in this example, the servo drive circuitry 15e and X, Y and Z loggers 22,23 and 24, each of which receives the output of the corresponding position sensor 16a, 17a and 15a, and a trigger generator 60 for triggering operation of the detector 10 in response to the output of the Z position sensor 15a to capture images at the required intervals. The controller 21 also receives an output from the coarse Z positioner position sensor 20a, if provided. The controller 21 may be programmed in known manner to compensate for any error in the Z position due to the slight arcuate nature of the motion of the objective lens assembly 13.

Figure 5:
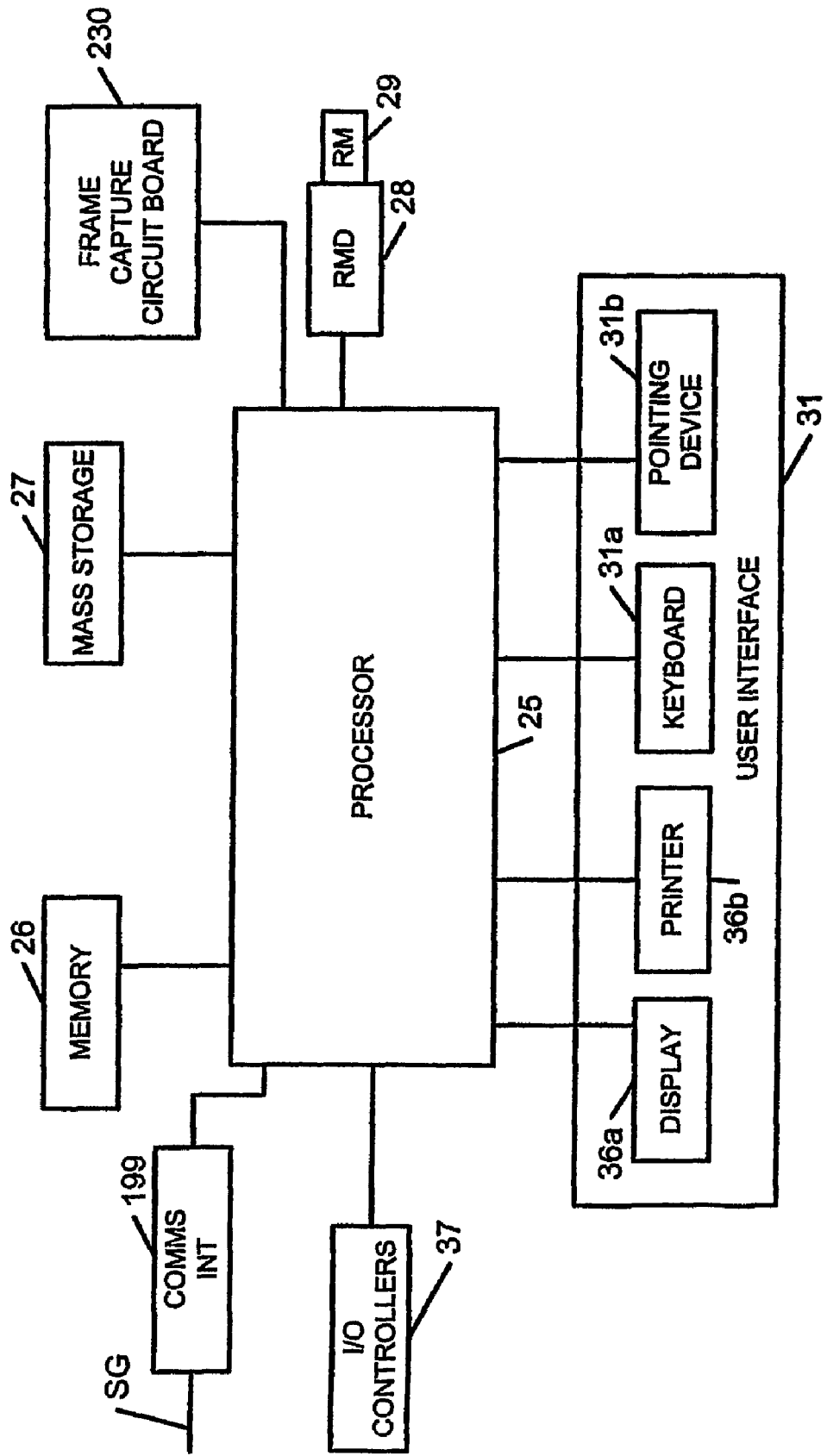
FIG. 5 shows a functional block diagram of computing apparatus that may be configured to provide the data processing and control apparatus shown in FIG. 3.

The data processing and control apparatus may be implemented by hardwired circuitry, by firmware, by digital signal processors, by one or more application specific integrated circuits (ASIC), or by programming one or more processors or by any combination of these. For example, at least the controller 21 and data processor 32 of the data processing and control apparatus may be implemented by programming computing apparatus, for example a personal computer. FIG. 5 shows a simplified block diagram of such computing apparatus. As shown, the computing apparatus has a processor 25 associated with memory 26 (ROM and/or RAM), a mass storage device 27 such as a hard disk drive, a removable medium drive (RMD) 28 for receiving a removable medium (RM) 29 such as a floppy disk, CDROM, DVD or the like, input and output (I/O) controllers 37 for interfacing with the components of the broadband scanning interferometer system to be controlled by the control apparatus (for example, the Z, X and Y movers 15 to 17, the coarse Z positioner 20 and the detector 10) to enable the processor 25 to control operation of these components. The user interface 31 consists, in this example, of a keyboard 31a, a pointing device 31b, a display such as a CRT or LCD display 36a and a printer 36b. The computing apparatus may also include a communications interface (COMMS INT) 199 such as a modem or network card that enables the computing apparatus to communicate with other computing apparatus over a network such as a local area network (LAN), wide area network (WAN), an Intranet or the Internet. In this example, the intensity data receiver 33 is provided as a dedicated frame capture circuit board 230 installed within the computing apparatus.

The processor 25 may be programmed to provide the data processor 32 and controller 21 by any one or more of the following ways: 1) by pre-installing program instructions and any associated data in a non-volatile portion of the memory 26 or on the mass storage device 27; 2) by downloading program instructions and any associated data from a removable medium 29 received within the removable medium drive 28; 3) by downloading program instructions and any associated data as a signal SG supplied from another computing apparatus via the communications interface 199; and 4) by user input via the user interface 31.

As so far described, the apparatus is similar to that described in the applicant's international application publication number WO03/078925, the whole contents of which are hereby incorporated by reference. Further details of an example of the interferometer system 2 and the control apparatus 30 described with reference to FIGS. 3 to 5 may be found in WO03/078925. An example of a commercially available apparatus that may be used is the Talysurf CCI 3000 produced by Taylor Hobson Limited of Leicester, England, United Kingdom. Although not shown, as in the case of the Talysurf CCI 3000, the stage 9 will also be tiltable about the Z axis to enable the user to ensure that the sample surface is parallel to the reference mirror 6 by, prior to measurement, adjusting the tip-tilt stage 9 to produce near-minimum fringe densities.

The apparatus 1 described above with reference to FIGS. 1 to 5 differs from that disclosed in WO03/078925 in that it is specifically intended for use in determining surface characteristics of a surface having a structure surface area which comprises at least one surface structure element such as a trench, a groove, a via, a mesa or a wall, for example, a surface having a structure surface area which comprises an array of such surface structure elements. In particular the apparatus may be capable of determining the width-to-pitch ratio (and the width if the pitch is independently known) and the size transverse or perpendicular to the surface (the height or depth) of an array of such surface structure elements, or the size of a single such surface structure element.

Figure 7:
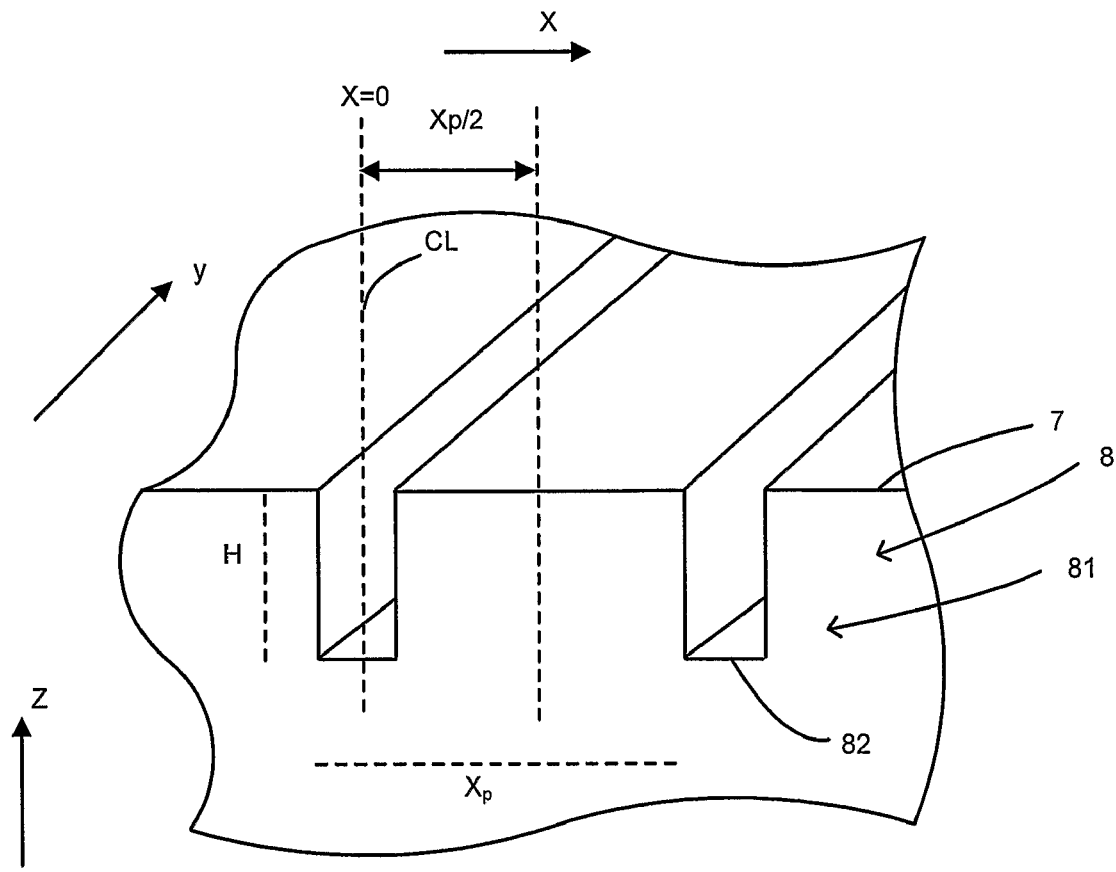
FIG. 7 shows a diagrammatic perspective view of part of a surface structure that may be measured using apparatus embodying the invention.
Figure 8:
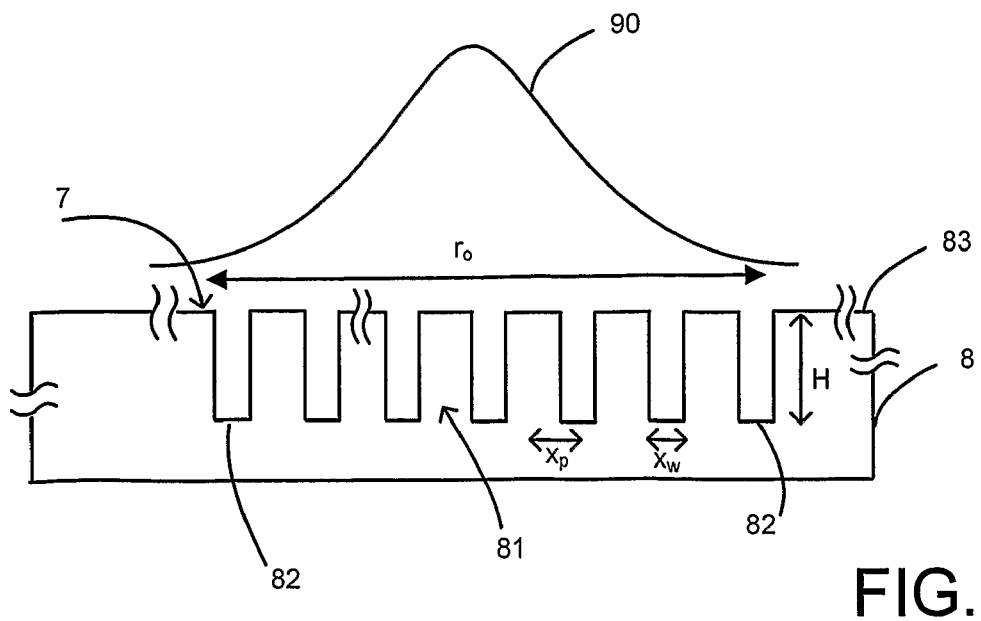
FIG. 8 shows a very schematic cross-sectional view for explaining the relationship between the numerical aperture of the objective of apparatus embodying the invention and a surface structure to be measured.

FIG. 1 illustrates very diagrammatically the sample 8 having a surface 7 with a structure surface area 81 comprising a parallel array of grooves or trenches 82 and with a non-structure surface area 83. This is shown more clearly in FIGS. 7 and 8. Thus, FIG. 7 shows a perspective view of a portion of part of the sample 8 and FIG. 8 shows a cross-sectional view of the part of the sample 8 or body. The grooves or trenches 82 extend in the y direction in FIGS. 7 and 8 so that the array has a given surface structure element-to-surface structure element pitch $x_p$ in the x direction. Examples of where such grooves or trenches may be provided in the semiconductor field are: 1) to receive isolation material to isolate different device structures of the same substrate 2) to define gate structures of, for example, a non-planar insulated gate field effect device; 3) to define a recessed gate junction field effect device. It will however be appreciated that there are many other instances in which such grooves or trenches may be required, in the semiconductor and other fields.

In order to enable determination of such surface characteristics, the interferometer 2 has an objective lens assembly (for example assembly 13 in FIG. 3) with a low numerical aperture (NA) so that, as illustrated schematically in FIG. 8, the width $r_o$ of the electric field point spread function (psf) 90 at the surface 7 of the sample 8 is significantly greater than the pitch $x_p$ (for example at least twice the pitch) of the surface structure area 81 to be characterised, and the data processor 32 comprises, as shown in FIG. 1, a structure determiner 100 configured to determine the width $x_w$ and height (or depth) H of such structures. There is no requirement for the structure surface 7 and non-structure surface to have the same z height. However, it is important to ensure that the light source illumination level is the same, that is constant, for both measurements.

The interferometer system is operable, under the control of the controller 21, to obtain, in either order:

i) intensity data ("structure intensity data") resulting from a measurement operation by the interferometer system 2 on a structure surface area of a sample comprising surface structure elements (such as the structure surface area 81 shown in FIGS. 7 and 8 comprising an array of grooves or trenches 82) with a low numerical aperture interferometer objective so that, as mentioned above, the point spread function 90 is such that the lateral extent of the light at the surface 7 is significantly greater than the pitch $x_p$, of the surface structure elements; and ii) intensity data ("non-structure intensity data") resulting from a measurement operation by the interferometer system 2 with the low numerical aperture objective on a non-structure surface area, that is a surface area, that does not contain surface structure, generally a planar surface. The non-structure surface area may be an area of the same sample, for example the non-structure surface area 83 in FIG. 8 or may be a non-structure surface area of another sample or body.

When the scan of the structure surface area 81 and the non-structure surface area, for example non-structure surface area 83, have been completed, then, for each surface pixel of the corresponding scanned surface area, a series of intensity data values, one from each frame of data, will have been acquired.

In this example, the structure determiner 100 is configured to:

1) determine:
   i) a frequency transform of structure surface intensity data received by the data processing and control apparatus 3, which frequency transform is referred to herein for simplicity as the "structure frequency transform", and
   ii) a frequency transform of non-structure surface intensity data received by the data processing and control apparatus 3, which frequency transform is referred to herein for simplicity as the "non-structure frequency transform";

2) determine a frequency transform ratio on the basis of the determined frequency transforms;

3) relate that ratio to a relationship representing the amplitude and phase of the electric field E(x,y,v) at the image plane of the interferometer system in terms of the width $x_w$, pitch $x_p$ and size transverse to the surface (height or depth) H of the surface structure elements (see FIGS. 7 and 8) as will be explained below; and 4) determine the width $x_w$ and size H of the surface structure elements on the basis of the frequency transform ratio and the pitch x, of the surface structure elements, where the pitch is separately provided, for example by making measurements using a conventional microscope.

The structure determiner 100 may be arranged to process the stored intensity data for one surface pixel at a time or alternatively, to improve the signal-to-noise ratio, to initially average the intensity data corresponding to a small set (for example 2×2 surface pixels) of adjacent surface pixels and then to process the averaged intensity data instead of the actual intensity data.

Where there may be a difference in surface height between the structure surface area and the non-structure surface area (for example where the structure surface area and the non-structure surface area are on different bodies, surfaces or samples), then the data processor 32 will also have, as shown in FIG. 1, a surface height determiner 101 to determine surface height in known manner, for example as discussed in the above Lee & Strand paper or in the manner described in WO03/078925, the whole contents of which are hereby incorporated by reference.

Figure 6:
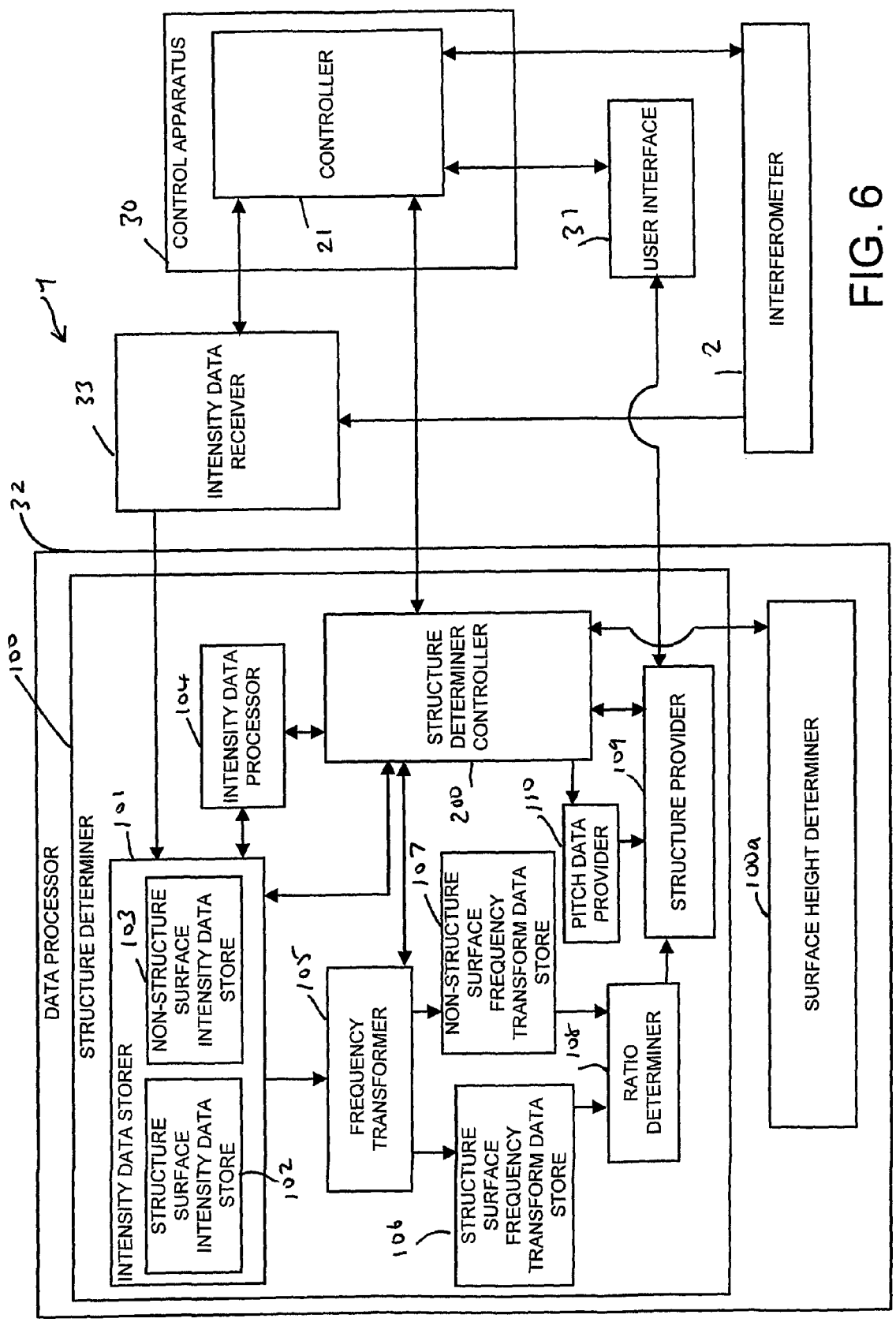
FIG. 6 shows a functional block diagram of the apparatus shown in FIG. 1 illustrating in greater detail a structure determiner of a data processor of the data processing and control apparatus.

FIG. 6 shows a functional block diagram illustrating an example of the functional components of the structure determiner 100. The functional blocks may be implemented by hardwired circuitry, by firmware, by one or more digital signal processors, by one or more application specific integrated circuits (ASIC), or by programming one or more processors or by any combination of these. It should of course be appreciated that FIG. 6 is merely a representational diagram and that the functional blocks shown need not necessarily exist as discrete entities, rather all of the functionality shown in FIG. 6 may be provided by a single unit or may be distributed between a number of discrete units.

In the example shown in FIG. 6, the structure determiner 100 has a structure determiner controller 200 to control overall operation of the structure determiner 100 and an intensity data storer 101 arranged, under the control of the controller 200, to store structure surface intensity data in a structure surface intensity data store 102 and to store non-structure surface intensity data in a non-structure surface intensity data store 103. As shown, an intensity data processor 104 may be provided to process either one or both of the structure surface intensity data and the non-structure surface intensity data prior to further use by the layer structure determiner 100, for example the intensity data processor 104 may be provided to average either or both sets of intensity data over a small number of adjacent surface pixels (for example 2×2 surface pixels) to provide, for each surface pixel, average intensity data to improve the signal-to-noise ratio.

The intensity data storer 101 is coupled to a frequency transformer 105 operable, under the control of the controller 200, to separately frequency transform the structure surface intensity data and the non-structure surface intensity data and to store the respective resulting frequency transform data in a structure surface frequency transform data store 106 and a non-structure surface frequency transform data store 107.

The structure surface frequency transform and non-structure surface frequency transform data stores 106 and 107 are coupled to a ratio determiner 108 which is operable, under the control of the structure determiner controller 200, to determine a ratio between the structure surface frequency transform and non-structure surface frequency transform and to provide that ratio to a structure provider 109 which is operable, under the control of the structure determiner controller 200, to calculate the average width $x_w$ and average size H of the surface structure elements using the determined ratio, a pitch value $x_p$ provided by a pitch data provider 110 of the structure determiner 100 and a relationship representing the amplitude and phase of the electric field E(x,y,v) at the image plane of the interferometer system in terms of the width-to-pitch $x_w$ to $x_p$ ratio and the size (height or depth) H of the surface structure elements.

The manner in which the structure determiner 100 operates will be explained below. However, before doing so, the derivation of the frequency transform ratio and the relationship representing the amplitude and phase of the electric field E(x,y,v) at the image plane of the interferometer system in terms of the width $x_w$, pitch $x_p$ and height or depth H will be explained.

As discussed in WO2006/005959, the whole contents of which are hereby incorporated by reference, the intensity data received by the intensity data receiver 33 has, for a typical location z within the interference pattern, an intensity I($\overline{z}$) given by the squared modulus of the electric field due to the light from the reference and sample as set out in equation 1 below:

$$I(\overline{z}) = |E_R(0) + E_S(\overline{z})|^2 \qquad 1)$$

where $E_R(0)$ is the electric field component resulting from light reflected from the reference, $E_S(\overline{z})$ is the electric field component resulting from light reflected from the sample and $\overline{z}$ is the average path length difference over the numerical aperture of the sensing element of the detector 10.

The right-hand side of equation 1) is equivalent to $$\int_0^\infty \left| \overline{A_R}(v) e^{i\overline{\phi_R}(v)} + \overline{A_S}(v) e^{i\overline{\phi_S}(v)} e^{i2\pi v \overline{z}} \right|^2 dv \qquad 2)$$

where the subscripts R and S represent the reference and sample, respectively, the overbars indicate integration over the numerical aperture so that $\overline{A_R}(v)$ and $\overline{A_S}(v)$ are the amplitudes integrated over the numerical aperture of the sensing element SE of the detector 10 at the frequency v for the reference and sample arm, respectively, and $e^{i\overline{\phi_R}(v)}$ and $e^{i\overline{\phi_S}(v)}$ represent the phase of the reference and sample beams, respectively, at that frequency v.

Bearing in mind that $|a+b|^2 = (a+b)(a^*+b^*)$ where * represents the complex conjugate and that $\cos(a) = \cos(-a)$ and $\sin(a) = -\sin(-a)$, expanding equation 2) gives:

$$I(\overline{z}) = \int_0^\infty \overline{A_R^2}(v) dv + \int_0^\infty \overline{A_S^2}(v) dv + \qquad 3)$$

$$2 \int_0^\infty \overline{A_R}(v) \overline{A_S}(v) \cos(\overline{\phi_S} - \overline{\phi_R} + 2\pi v \overline{z}) dv$$

Thus, as can be seen from equation 3, the intensity data I($\overline{z}$) for a given location in the interference pattern comprises a DC or non-varying component represented by the first two terms in equation 3 and an AC or varying component represented by the last term in equation 3. It is the AC or varying component that provides the interference pattern.

Now assuming that the amplitude is symmetric, that is: $A_R(-v) = A_R(v)$, defining the phase difference between the sample and reference light beams as $\Delta\phi = \phi_S - \phi_R$, and assuming that, since the AC component is real, $\Delta\phi(-v) = -\Delta\phi(v)$ then, from equation 3, the AC component is $$AC(z) = 2 \int_0^\infty \overline{A_R}(v) \overline{A_S}(v) \cos(\overline{\phi_S} - \overline{\phi_R} + 2\pi v \overline{z}) dv \qquad 4)$$

$$= \int_{-\infty}^\infty \overline{A_R}(v) \overline{A_S}(v) \cos(\overline{\Delta\phi} + 2\pi v \overline{z}) dv$$

which, bearing in mind that $\cos a = (e^{ia} + e^{-ia})/2$, gives $$2AC(\overline{z}) = \qquad 5)$$

$$\int_{-\infty}^\infty \overline{A_R}(v) \overline{A_S}(v) e^{i\overline{\Delta\phi}(v)} e^{i2\pi v \overline{z}} dv + \int_{-\infty}^\infty \overline{A_R}(v) \overline{A_S}(v) e^{-i\overline{\Delta\phi}(v)} e^{-i2\pi v \overline{z}} dv$$

Now for both integrals the amplitude is localised around $\pm v_o$, where $$v_o = \frac{\int_0^\infty \overline{A_R(v)A_S(v)} v \, dv}{\int_0^\infty \overline{A_R(v)A_S(v)} \, dv} \qquad 6)$$

so they may be divided:

$$2AC(\bar{z}) = \int_{-\infty}^\infty \overline{A_R^o(v-v_o)A_S^o(v-v_o)} e^{+i\Delta\phi^o(v-v_o)} e^{+i2\pi v\bar{z}} dv + \qquad 7)$$
$$\int_{-\infty}^\infty \overline{A_R^o(v+v_o)A_S^o(v+v_o)} e^{+i\Delta\phi^o(v+v_o)} e^{+i2\pi v\bar{z}} dv +$$
$$\int_{-\infty}^\infty \overline{A_R^o(v-v_o)A_S^o(v-v_o)} e^{-i\Delta\phi^o(v-v_o)} e^{-i2\pi v\bar{z}} dv +$$
$$\int_{-\infty}^\infty \overline{A_R^o(v+v_o)A_S^o(v+v_o)} e^{-i\Delta\phi^o(v+v_o)} e^{-i2\pi v\bar{z}} dv$$
$$= (e^{+i2\pi v_o\bar{z}} + e^{-i2\pi v_o\bar{z}}) \left\{ \begin{array}{c} \mathscr{F}\left(\overline{A_R^o(v)A_S^o(v)} e^{+i\Delta\phi^o(v)}\right) + \\ \mathscr{F}^{-1}\left(\overline{A_R^o(v)A_S^o(v)} e^{-i\Delta\phi^o(v)}\right) \end{array} \right\}$$

Here advantage has been taken of the fact that the spectral functions may be re-expressed in terms of a set of functions, $\overline{A_R^o(v)}$, $\overline{A_S^o(v)}$, $\Delta^o\phi(v)$ which are identical to $\overline{A_R(v)}$, $\overline{A_S(v)}$, $\Delta\phi(v)$ apart from the fact that they are centred about zero.

Re-expressing $AC(\bar{z})$:

$$AC(\bar{z}) = \cos 2\pi v_o \bar{z} \left\{ \begin{array}{c} \mathscr{F}\left(\overline{A_R^o(v)A_S^o(v)} e^{+i\Delta\phi^o(v)}\right) + \\ \mathscr{F}^{-1}\left(\overline{A_R^o(v)A_S^o(v)} e^{-i\Delta\phi^o(v)}\right) \end{array} \right\} \qquad 8)$$
$$= \cos(2\pi v_o(Z_k + 2\overline{\Delta z})) \left\{ \begin{array}{c} \mathscr{F}\left(\overline{A_R^o(v)A_S^o(v)} e^{+i\Delta\phi^o(v)}\right) + \\ \mathscr{F}^{-1}\left(\overline{A_R^o(v)A_S^o(v)} e^{-i\Delta\phi^o(v)}\right) \end{array} \right\}$$

where the path difference between the sample and reference beams, $\bar{z}$, has been re-written as $$\bar{z} = \overline{Z_k} + 2\overline{\Delta z} \qquad 9)$$

where $\overline{\Delta z}$ is the difference between the z position of the reference and the closest step of the scan, $\overline{Z_k}$ is the net path length displacement of the sample corresponding to the $k^{th}$ step ($=2k\overline{\Delta z_{step}}$) and the over line indicates that the value is integrated over the numerical aperture of the sensing element SE of the detector.

This expression shows that the envelope of the AC component, that is the correlation, is given by the real component of the Fourier transform $\mathscr{F}(\overline{A_R^o(v)A_S^o(v)} e^{i\Delta^o\phi(v)})$. Concentrating on this correlation term, since, generally $\mathscr{F}(AB)=\mathscr{F}(A)\mathscr{F}\circledast(B)$ (where $\circledast$ represents the convolution symbol), the Fourier transform of $AC(\bar{z})$ is given by the convolution $$\mathscr{F}(AC) = e^{-i4\pi v\overline{\Delta z}} \frac{\delta(v-v_o) + \delta(v+v_o)}{2} \otimes \qquad 10)$$
$$\mathscr{F}\left( \begin{array}{c} \mathscr{F}\left(\overline{A_R^o(v)A_S^o(v)} e^{+i\Delta\phi^o(v)}\right) + \\ \mathscr{F}^{-1}\left(\overline{A_R^o(v)A_S^o(v)} e^{-i\Delta\phi^o(v)}\right) \end{array} \right)$$
$$= e^{-i4\pi v\overline{\Delta z}} (\delta(v-v_o) + \delta(v+v_o)) \otimes \overline{A_R^o(v)A_S^o(v)} e^{-i\Delta\phi^o(v)}$$

where the fact that $\mathscr{F}(\overline{A_R^o(v)A_S^o(v)} e^{+i\Delta\phi^o(v)})$ is the conjugate of $\mathscr{F}^{-1}(\overline{A_R^o(v)A_S^o(v)} e^{-i\Delta\phi^o(v)})$ has been used. This shows that $\mathscr{F}(AC(\overline{Z_k}))$ consists of sidebands centred about $\pm v_o$. If the suffix 'SB+' implies the positive-arm sideband, then from equations 3, 4 and 10, the important identity is obtained:

$$\mathscr{F}(I(\overline{Z_k}))_{SB+} = \mathscr{F}(AC(\overline{Z_k}))_{SB+} \qquad 11)$$
$$= e^{-i4\pi v\overline{\Delta z}} \overline{A_R(v)A_S(v)} e^{-i\Delta\phi(v)}$$

Given also that $\overline{Z_k} = Z_k \cos\theta_o$, $\qquad 12)$

, then for uniform illumination, a reasonable approximation for low numeric aperture is:

$$\overline{\cos\theta_o} = \frac{\int_{\theta_{min}}^{\theta_{max}} \theta \cos\theta \, d\theta}{\int_{\theta_{min}}^{\theta_{max}} \theta \, d\theta} = 2\left( \frac{\theta_{max}\sin\theta_{max} + \cos\theta_{max} -}{\theta_{min}\sin\theta_{min} - \cos\theta_{min}} \right) \qquad 13)$$

where $\theta_{min}$ and $\theta_{max}$ are the minimum and maximum angles of incidence accepted by the numerical aperture and $\theta_{min}$ will be zero in the case of a Michelson interferometer.

Equations 3, 4, 9, 11 and 12 thus relate the intensity for a surface pixel in a scan to the average amplitude of the reference and sample light beams and the phase difference between the sample and reference light beams, as a function of frequency $v$. Equations 12 and 13 show that for low numerical aperture objectives, $\overline{Z_k}$ is well approximated by $Z_k$.

In the case of a Fourier transformation, the frequency transform of the intensity data is related to the intensity function as follows:

$$\mathscr{F}(I(Z_k)) = \int_{-\infty}^\infty I(Z_k) e^{i2\pi v Z_k} \, dZ_k \qquad 14)$$

The ratio determiner 108 is configured to determine a ratio (the "HCF ratio" where HCF stands for Helical Conjugate Field) between the positive frequency space sidebands of the Fourier transforms $\mathscr{F}(I_{structure}(Z_k))_{SB+}$ and $\mathscr{F}(I_{non-structure}(Z_k))_{SB+}$ of the intensity data for the structure surface area 81 and the non-structure surface area 83. For low numerical aperture, this ratio is:

$$HCF(v) = r^*_{ref}(v) \frac{\mathscr{F}_{structure}(I(Z_k))_{SB+}}{\mathscr{F}_{non-structure}(I(Z_k))_{SB+}} \qquad 15)$$

where $r^*_{ref}(v)$ is the net reflected electric field of the non-structure surface area. Bearing in mind as set out in equation 11 above that:

$$\mathscr{F}(I(\overline{Z_k}))_{SB+} = \mathscr{F}(AC(\overline{Z_k}))_{SB+} = e^{-i4\pi v\overline{\Delta z}} \overline{A_R(v)A_S(v)} e^{-i\Delta\phi(v)} \qquad 11)$$

then the HCF ratio is also given by:

$$HCF(v) \equiv a_{HCF}(v)e^{i\phi_{HCF}(v)} \qquad 16)$$
$$\equiv E^*(v)e^{-i4\pi v(\Delta z_{structure}-\Delta z_{non-structure})}$$
$$\equiv E^*(v)e^{-i4\pi v\Delta z_{HCF}}$$

where * indicates the conjugate and $\Delta z_{HCF}$ is, as indicated, the difference between the surface height $\Delta z_{structure}$ determined for the structure surface area and the surface height $\Delta z_{non-structure}$ determined for the non-structure surface area.

The HCF ratio thus provides a representation of the electric field at the image plane, in particular a representation of the conjugate of the electric field.

As set out above, the interferometer system 12 is configured so that the numerical aperture of the interferometer objective (referenced 14 in FIG. 3) is sufficiently small that the electric field point spread function (PSF) has (see FIG. 8) a width $r_o$ at the surface 7 of the sample being measured that is significantly greater (at least two times greater) than the pitch $x_p$ of the surface structure elements 82 so that the individual surface structure elements 82 are not resolved in the image acquired by the interferometer. In these circumstances, in the image plane the electric field $E(x,y,v)$ corresponding to the set or array of surface structure elements 82 is given by the following convolution:

$$E(x,y,v) = r(v)(\text{psf}(x,y) \otimes \text{comb}(x/x_p) \otimes F(x,y)) \qquad 17)$$

where $\otimes$ represents a convolution, $r(v)$ is the net electrical-field reflectance, psf is the electric field point spread function which, for the purposes of this explanation, may be approximated by a Gaussian:

$$\text{psf}(x,y) = \frac{1}{r_o^2} e^{-\pi\left(\frac{x^2+y^2}{r_o^2}\right)} \qquad 18)$$

and comb(x/xp) is a comb function representing a repeating unit of the surface structure over a distance $x_p/2$ in the x direction in FIG. 7 corresponding to half the surface structure element pitch $x_p$ and starting from an x=0 position at a centre line CL through a trench. This comb function is defined by:

$$\text{comb}(x/x_p) = \sum_{j=-\infty}^{\infty} \delta(x/x_p - j) \qquad 19)$$

where $\delta$ is of course a delta function and j is an integer.

The near field electric field $F(x,y)$, that is the electric field in the proximity, typically within micrometres, of the surface (hereinafter the "surface electric field") has a phase that is modified by the surface structure or topography and is given by:

$$F(x,y) = \begin{cases} \frac{1}{x_p} e^{+i\frac{4\pi}{\lambda}H} & \text{where } (|x| \leq x_w/2) \\ \frac{1}{x_p} & \text{where } (x_p/2 \geq |x| > x_w/2) \\ 0 & \text{where } (|x| > x_p/2) \end{cases} \qquad 20)$$

where the first term represents the surface electric field resulting from a surface structure element 82 and the second term represents the surface electric field resulting from the surface 7. In the structure shown in FIG. 7 the surface structure elements 82 extend in parallel (like a grating) in the y direction and accordingly for a given x the topographic field in the y direction will be constant.

The electric field convolution of equation 17 is therefore given by:

$$E(x,y,v) = r(v)\left(\frac{1}{r_o}e^{-\pi\left(\frac{x}{r_o}\right)^2} \otimes \text{comb}(x/x_p) \otimes F(x,y)\right) \cdot \qquad 21)$$
$$\left(\frac{1}{r_o}e^{-\pi\left(\frac{y}{r_o}\right)^2} \otimes F(x,y)\right)$$
$$= \frac{r(v)}{r_o}e^{-\pi\left(\frac{x}{r_o}\right)^2} \otimes \text{comb}(x/x_p) \otimes F(x,y)$$

Because there is no structure in the y direction (y being constant for a given x because in this example the surface structure elements extend in the y direction) then:

$$\left(\frac{1}{r_o}e^{-\pi\left(\frac{y}{r_o}\right)^2} \otimes F(x,y)\right) = \mathscr{F}^{-1}\left(e^{-\pi f^2 r_o^2} \cdot \delta(f)\right) = 1 \qquad 22)$$

The convolution expression of equation 21 may be solved by taking advantage of the fact that a convolution corresponds to a multiplication in Fourier space. The Fourier transform of $F(x,y)$ in the direction of x is given by:

$$\mathscr{F}(F(x,y)) = \int_{-\infty}^{\infty} F(x,y)e^{-i2\pi fx}dx \qquad 23)$$
$$= \frac{r(v)}{x_p}\left(\int_{-x_p/2}^{x_p/2} e^{-i2\pi fx} \cdot dx - (1 - e^{+i\frac{4\pi}{\lambda}H})\int_{-x_w/2}^{x_w/2} e^{-i2\pi fx} \cdot dx\right)$$
$$= \frac{r(v)}{x_p}(x_p \text{sinc}(\pi f x_p) - x_w(1 - e^{+i\frac{4\pi}{\lambda}H})\text{sinc}(\pi f x_w))$$

Similarly, the Fourier transform of the comb function is given by:

$$\frac{1}{r_o}\mathscr{F}(\text{comb}(x/x_p)) = \frac{1}{r_o}x_p\text{comb}(fx_p) \qquad 24)$$

Because, in this example, y is constant for a given x (because the surface structure elements extend in the y direction), it is only necessary to consider the electric field point spread function in the x direction. The Fourier transform of psf(x) is:

$$\frac{1}{r_o}\mathscr{F}\left(e^{-\pi\left(\frac{x}{r_o}\right)^2}\right) = e^{-\pi f^2 r_o^2} \qquad 25)$$

So, the electric field is given by the inverse Fourier relationship:

$$E(x, y, \nu) = r(\nu)\mathscr{F}^{-1}\left(e^{-\pi f^2 r_o^2}\text{comb}(fx_p)\begin{pmatrix} x_p\text{sinc}(\pi fx_p) - \\ x_w(1 - e^{+i\frac{4\pi}{\lambda}H})\text{sinc}(\pi fx_w) \end{pmatrix}\right) \quad 26)$$

$$= r(\nu)(E_A - E_B)$$

where $$E_A = \int_{-\infty}^{\infty} e^{-\pi f^2 r_o^2}\text{comb}(fx_p)x_p\text{sinc}(\pi fx_p)e^{i2\pi fx}df \quad 27)$$

$$E_B = \int_{-\infty}^{\infty} e^{-\pi f^2 r_o^2}\text{comb}(fx_p)x_w(1 - e^{+i\frac{4\pi}{\lambda}H})\text{sinc}(\pi fx_w)e^{i2\pi fx}df$$

The expression for $E_A$ in equation 27 may be expanded as follows:

$$E_A = 1/x_p \int_{-\infty}^{\infty} e^{-\pi f^2 r_o^2} x_p \sum_{j=-\infty}^{\infty} \quad 28)$$

$$\delta(fx_p - j)x_p\text{sinc}(\pi fx_p)e^{i2\pi fx}df$$

$$= 1/x_p \int_{-\infty}^{\infty} e^{-\pi f^2 r_o^2} \sum_{j=-\infty}^{\infty}$$

$$\delta(f - j/x_p)x_p\text{sinc}(\pi fx_p)e^{i2\pi fx}df$$

$$= 1/x_p \sum_{j=-\infty}^{\infty} e^{-\pi j^2\left(\frac{r_o}{x_p}\right)^2} x_p\text{sinc}(\pi j)\cos 2\pi j\frac{x}{x_p}$$

$$= 1$$

As set out above, to ensure that the lateral features are well beyond the resolution of the interferometer system, $r_o \gg x_p$. Accordingly, in equation 28 above, the exponent term dominates (and is extremely small) unless j is zero and when j is zero, then sinc(0)=1 and cos(0)=1 so that $E_A$ equals 1.

The expression for $E_B$ in equation 27 may be expanded as follows:

$$E_B = 1/x_p \int_{-\infty}^{\infty} e^{-\pi f^2 r_o^2} x_p \sum_{j=-\infty}^{\infty} \delta(fx_p - j)x_w \quad 29)$$

$$(1 - e^{+i\frac{4\pi}{\lambda}H})\text{sinc}(\pi fx_w)e^{i2\pi fx}df$$

$$= 1/x_p \int_{-\infty}^{\infty} e^{-\pi f^2 r_o^2} \sum_{j=-\infty}^{\infty} \delta(f - j/x_p)$$

$$x_w(1 - e^{+i\frac{4\pi}{\lambda}H})\text{sinc}(\pi fx_w)e^{i2\pi fx}df$$

$$= \sum_{j=-\infty}^{\infty} e^{-\pi j^2\left(\frac{r_o}{x_p}\right)^2} \frac{x_w}{x_p}(1 - e^{+i\frac{4\pi}{\lambda}H})\text{sinc}\left(\pi j\frac{x_w}{x_p}\right)\cos 2\pi j\frac{x}{x_p}$$

Because $r_o \gg x_p$, the exponent term in equation 29 dominates (and is extremely small) unless j=0. Accordingly, the series expression for $E_B$ collapses to leave the j=0 term only, giving:

$$E_A = 1 \quad 30)$$

$$E_B = \frac{x_w}{x_p}(1 - e^{+i\frac{4\pi}{\lambda}H})$$

So that finally, the image plane electric field $E(x,y,\nu)$ is given by $$E(x, y, \nu)/r(\nu) = (E_A - E_B) \quad 31)$$

$$= 1 - \frac{x_w}{x_p}(1 - e^{+i\frac{4\pi}{\lambda}H})$$

$$= (1 - \beta) + \beta e^{+i\frac{4\pi}{\lambda}H}$$

where $$\beta = x_w/x_p.$$

This image plane field thus contains no spatial information and instead consists of the linear superposition of two phasors (where a phasor is a complex number representing a sinusoidal quantity usually in exponential form and in this example the first phasor has zero phase) weighted by the 'mark-to-space' (width-to-pitch) ratio 13 of the array of surface structure elements 82.

As a natural extension, it is evident that the simple weighted phasor behaviour of the image plane field implies that for a 2D structure consisting of say trenches of depth $H_y$ orientated in the y-direction $\beta_y = x_{wy}/x_{py}$, together with say trenches of depth $H_x$ orientated in the x-direction $\beta_x = x_{wx}/x_{px}$, the image plane electric fields corresponding to a band of coherent illumination in the x-direction $\overline{E}_x(\nu)$, in the y-direction, $\overline{E}_y(\nu)$ and over both the x and y directions, $\overline{E}(\nu)$ are given by:

$$\overline{E}_x(\nu)/r(\nu) = (1-\beta_y) + \beta_y e^{+i4\pi\nu H_y}$$

$$\overline{E}_x(\nu)/r(\nu) = (1-\beta_x) + \beta_x e^{+i4\pi\nu H_x} \quad 32)$$

As set out above, the frequency ratio or HCF function is related to the conjugate $E^*(x,y)$ of the electric field $E(x,y,\nu)$ in the image plane so that:

$$HCF(\nu) = r^*_{ref}(\nu)\frac{\mathscr{F}_{structure}(\gamma(X_k))}{\mathscr{F}_{non-structure}(\gamma(X_k))} \quad 33)$$

$$= r^*(\nu)((1 - \beta) + \beta e^{-i4\pi\nu H})e^{-i4\pi\nu\Delta z_{HCF}}$$

where $\Delta z_{HCF}$ represents any difference in the z direction (the scan direction) between the surface height of the structure surface area top surface 7 (that is the height the surface would be without the trenches) and the non-structure surface area 83 which, as set out above, need not necessarily be part of the same sample.

If $\Delta z_{HCF}$=0 then trivially the electric field $E(x,y,\nu)$ is equal to the conjugate of the HCF function, $E(\nu)$=HCF*$(\nu)$, so that:

$$\text{Re}(E(\nu)/r(\nu)) = 1-\beta+\beta\cos 4\pi\nu H \quad 34)$$

$$\text{Im}(E(\nu)/r(\nu)) = \beta\sin 4\pi\nu H \quad 35)$$

so that $\beta$=1−DC and H=1/(2P) where P is the period of the AC component of the HCF function and DC is the DC offset of the HCF function. Accordingly, the trench depth or height H can be calculated or determined by using frequency domain analysis, in this example Fourier analysis, to determine the dominant frequency and thus the dominant period P and then calculating H=1/(2P). β can be calculated or determined by determining the mean of the real part of the HCF function to obtain the DC offset and then calculating β=1−DC, the width $x_W$ may then be determined from $βx_p$, assuming the pitch $x_p$ is known.

If the frequency analysis does not show a dominant frequency and thus period, then the size (height or depth) of the surface structure elements may be too small to distinguish the period using frequency domain analysis. As another possibility, a fitting procedure may be used in which the real and imaginary parts of the HCF function are set equal to the right hand sides of equations 34 and 35 and β and H are modified from initial guesses, until a best fit is determined on the basis of a merit function is met. Examples of fitting procedures that may be used are a conjugate gradient method or a simulated annealing method. These techniques are discussed in 'Numerical Recipes in Fortran: The Art of Scientific Computing, Second Edition' by William H. Press, Saul A. Teukoisky, William T. Vettering and Brian R. Flannery (ISBN 0-521-43064) in section 10.6 at pages 413 to 416 and section 10.9 at pages 436 to 438. The conjugate gradient method starts from the steepest descent method first proposed by Cauchy in which the procedure steps from point to point by minimising along the direction of the local gradient until a merit function calculated after each step reaches a desired value but, rather than proceeding in the direction of the new gradient at each step, proceeds in a direction which is conjugate to the old gradient. As an example, a conjugate gradient method based on the approach proposed by Fletcher-Reeves discussed in the aforementioned section 10.6 of 'Numerical Recipes in Fortran' may be used.

If $Δz_{HCF}≠0$ (as is most likely if the structure surface area and non-structure or reference surface areas are on different substrates or bodies) then the surface heights Δz of the surface pixels for both the structure surface area and the non-structure surface area are determined by the surface height determiner 100a, for example using the technique described in WO03/078925 and the mean x-direction electric field centred about the y-row surface pixel k may be determined, on the basis of equation 16 above as:

$$\overline{E}_k(v) = \frac{1}{N_x} \qquad 36)$$

$$\sum_{j=1}^{N_x} \begin{pmatrix} \cos 4\pi v \begin{pmatrix} \Delta z_{structure} - \\ \Delta z_{non\text{-}structure} \end{pmatrix}_{jk} & \sin 4\pi v \begin{pmatrix} \Delta z_{structure} - \\ \Delta z_{non\text{-}structure} \end{pmatrix}_{jk} \\ -\sin 4\pi v \begin{pmatrix} \Delta z_{structure} - \\ \Delta z_{non\text{-}structure} \end{pmatrix}_{jk} & \cos 4\pi v \begin{pmatrix} \Delta z_{structure} - \\ \Delta z_{non\text{-}structure} \end{pmatrix}_{jk} \end{pmatrix}$$

$$\begin{pmatrix} \operatorname{Re}(HCF_j(v)) \\ -\operatorname{Im}(HCF_j(v)) \end{pmatrix}$$

where $N_x$ is the number of pixels in the (x-direction) row, $Δz_{structure}$ is the surface height determined for the $jk^{th}$ structure surface area surface pixel, and $Δz_{non\text{-}structure}$ is the surface height determined for the $jk^{th}$ non-structure or reference surface area surface pixel.

Similarly, the mean y-direction electric field centred about the x-column surface pixel j may be determined as:

$$\overline{E}_j(v) = \frac{1}{N_y} \qquad 37)$$

$$\sum_{k=1}^{N_y} \begin{pmatrix} \cos 4\pi v \begin{pmatrix} \Delta z_{structure} - \\ \Delta z_{non\text{-}structure} \end{pmatrix}_{jk} & \sin 4\pi v \begin{pmatrix} \Delta z_{structure} - \\ \Delta z_{non\text{-}structure} \end{pmatrix}_{jk} \\ -\sin 4\pi v \begin{pmatrix} \Delta z_{structure} - \\ \Delta z_{non\text{-}structure} \end{pmatrix}_{jk} & \cos 4\pi v \begin{pmatrix} \Delta z_{structure} - \\ \Delta z_{non\text{-}structure} \end{pmatrix}_{jk} \end{pmatrix}$$

$$\begin{pmatrix} \operatorname{Re}(HCF_j(v)) \\ -\operatorname{Im}(HCF_j(v)) \end{pmatrix}$$

For a trench structure in which the trenches extend as shown in FIGS. 7 and 8 in the y-direction then the real and imaginary components of $\overline{E}_k(v)$, provide:

$$\operatorname{Re}(\overline{E}_k(v)/r(v)) = 1 - β_y + β_y \cos 4\pi v H_y \qquad 38)$$

$$\operatorname{Im}(\overline{E}_k(v)/r(v)) = β_y \sin 4\pi v H_y \qquad 39)$$

where $\overline{E}_k(v)/r(v)$ is the mean unity reflected electric field. and likewise for a trench structure in which the trenches extend in the x-direction, $$\operatorname{Re}(\overline{E}_j(v)/r(v)) = 1 - β_x + β_x \cos 4\pi v H_x \qquad 40b)$$

$$\operatorname{Im}(\overline{E}_j(v)/r(v)) = β_x \sin 4\pi v H_x \qquad 40b)$$

which correspond to equations 34 and 35 above, so that, again, β=1−DC and H=1/(2P) where, in this case, P is the period of the AC component of the mean unity reflected electric field, and DC is the DC offset of the mean unity reflected electric field. Accordingly, as above, the trench depth or height H can be calculated or determined by using frequency domain analysis and β can be calculated or determined by determining the mean of the real part of the mean unity reflected electric field to obtain the DC offset. As another possibility, a fitting procedure may be used as described above, especially if the frequency analysis does not show a dominant frequency.

The approach described above with reference to equations 36 to 40b may also be used where $Δz_{HCF}$ is equal to zero and should improve the signal to noise in that case.

Where the width of the surface structure elements 82 is comparable to the nominal mean wavelength λ of the broadband source 4, that is $x_w \sim λ$, the absorption losses within the surface structure elements 82 are strongly wavelength dependent and the HCF function becomes:

$$HCF(v) = r^*(v)((1-β) + βe^{-α(v)H} e^{-i4\pi vH}) e^{-i4\pi v \Delta z_{HCF}} \qquad 41)$$

where α, the absorption coefficient, represents the absorption loss which is a function of frequency.

So that, by analogy with equations 34 and 35, for the case when $Δz_{HCF}=0$, then, given that this means that E(v)=HCF*(v) so that:

$$\operatorname{Re}(E(v)/r(v)) = 1 - β + βe^{-α(v)H} \cos 4\pi v H \qquad 42a)$$

$$\operatorname{Im}(E(v)/r(v)) = βe^{-α(v)H} \sin 4\pi v H \qquad 42b)$$

and for the case when $Δz_{HCF} ≠ 0$ then by analogy with equations 39a, 39b, 40a and 40b above, $$\operatorname{Re}(\overline{E}_j(v)/r(v)) = 1 - β_x + β_x e^{-α(v)H_x} \cos 4\pi v H_x \qquad 43a)$$

$$\operatorname{Im}(\overline{E}_j(v)/r(v)) = β_x e^{-α(v)H_x} \sin 4\pi v H_x \qquad 43b)$$

β and H can then be determined in a similar manner to previously. The DC level of the extracted left-hand side of equation 42a corresponds to 1−β so that β=1−DC. The dominant frequency may be extracted using a Fourier analysis to provide H=½P or alternatively the phase may be extracted directly using $$\tan 4\pi v H = \frac{\operatorname{Im}\left(HCF(v)\frac{r_{ref}(v)}{r(v)}\right)}{\beta - 1 + \operatorname{Re}\left(HCF(v)\frac{r_{ref}(v)}{r(v)}\right)} \quad 44)$$

This approach yields a set of estimates of H (designated $H_j$) which may be used to provide an optimum estimate of H using the corresponding amplitude weightings, these based on the application of the trigonometrical identity $\cos^2 \theta + \sin^2 \theta = 1$ to equations 43a and 43b:

$$w_j(v) = \frac{1}{\beta^2} e^{-2\alpha(v)H} \quad 44a)$$

$$= \frac{1}{\beta^2} (\operatorname{Re}(\overline{E}_j(v)/r(v)) - 1 + \beta)^2 + (\operatorname{Im}(\overline{E}_j(v)/r(v)))^2$$

Clearly, for the cases when the absorption term is significant (when there is a high aspect ratio ($H/x_w$) or when $x_w < \lambda_o$) then it may be preferable to apply a similar optimisation approach to equations 42a and 42b as described above.

The maximum-surface structure element size (height/depth) that can be determined is limited by the Nyquist criterion so that:

$$v_{period_{mod}} \geq v_{period_{Nyq}} \quad 45)$$

Taking the case where $\Delta z_{HCF} \neq 0$ (which is likely to be the normal situation), then given that:

$$v = j\Delta v = \frac{j}{N\Delta z_{net}} = \frac{j}{2N\Delta z} = j\frac{4}{N\lambda_0} \quad 46)$$

where from above:

$$v_{period_{mod}} = \frac{1}{2H} \quad 47)$$

and $$v_{period_{Nyq}} = 2\Delta v = 8/(N\lambda_0) \quad 48)$$

where N is the total number of sequential steps in a scan, $\lambda_o/8$ is the scan step and $\lambda_o$ is the nominal mean wavelength of the interferometer.

The maximum surface structure element size (height or depth) $H_{MAX}$ is thus given by:

$$H_{MAX} \leq N\lambda_o/16 \quad 49)$$

to satisfy the Nyquist criterion.

Regarding the high frequency limit, the illumination from the interferometer may be approximated by a wavelength-domain Gaussian:

$$G(\lambda) = e^{-\left(\frac{\lambda - \lambda_0}{\Delta \lambda}\right)^2} \quad 50)$$

There is a threshold below which the modulation (the AC component of the intensity data signal) is not usable. This threshold (the interference (field) threshold) may be expressed by requiring the modulation level (the AC component level) of the intensity data signal to be at least a minimum percentage, for example 20%, of the DC level. If the interference (field) threshold is γ then:

$$v_{\pm} = \frac{1}{\lambda_0 \mp \Delta\lambda \sqrt{-\ln\gamma}} \quad 51)$$

so that a reasonable estimate of the lowest frequency capable of measurement within the instrument bandwidth is:

$$\frac{v_{period_{mod}}}{2} \leq v_{+} \quad 52)$$

and the minimum surface structure element size (height or depth) $H_{MIN}$ that can be measured is given by:

$$H_{MIN} \geq \frac{1}{4v_{+}} \quad 53)$$

Now, for the Talysurf CCI 3000 the positive sideband frequency $v_{+} \approx 2.5$ μm$^{-1}$, so that the surface structure element size (height or depth) H range that can be measured is given approximately by:

$$100 \text{ nm} \leq H \leq \text{Scan Range}/2$$

where the Scan Range=$N\lambda_o/8$

It will be appreciated that the above analysis is provided to assist in the understanding of the technique and that different approaches may be adopted to this analysis. The actual analysis technique used is not important. Rather, what is important is the realisation that the surface structure element size (height or depth) and width (or width-to-pitch ratio if the pitch is not independently known) of surface structure elements such as, for example, trenches or grooves can be determined by: carrying out a coherence scanning measurement operation on a surface area 81 carrying the structure using a low numeric aperture objective (so that the pitch of the surface structure elements 82 is much less that the spread of the point spread function at the surface 7) to obtain structure surface intensity data; carrying out a coherence scanning measurement operation on a non-structure surface area 83 (which may be part of the same sample or a different sample) using the same low numeric aperture objective to obtain non-structure surface intensity data; relating a frequency transform ratio (the "HCF function") related to the ratio between the structure surface intensity data and the non-structure surface intensity data (in the example described above the ratio of the positive frequency space sidebands of the Fourier transforms) equal to an expression which represents the conjugate of the electric field at the image plane of the interferometer system in terms of surface structure element size (height or depth) and width-to-pitch ratio; and then deriving the surface structure element size and width-to-pitch ratio using the frequency transform ratio, and extracting the surface structure element width, if the pitch is independently known.

Figure 9:
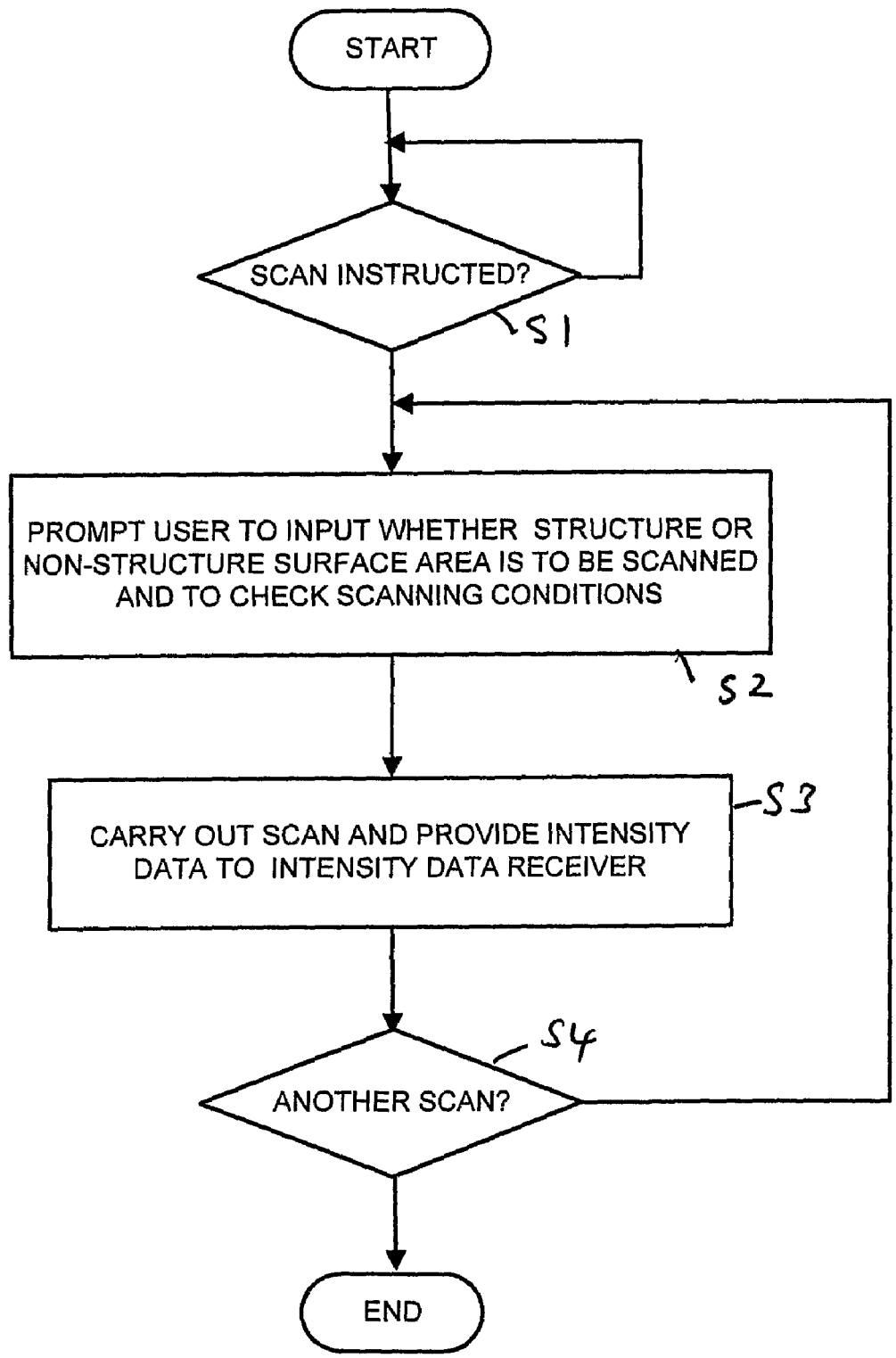
FIGS. 9 to 11 show flow charts for explaining operation of the apparatus.

Operation of the apparatus described above to determine the width and depth of trenches or grooves such as those shown in FIGS. 7 and 8 will now be described with the aid of the flowcharts shown in FIGS. 9 to 11.

Assuming the user has carried out, via the user interface 31 (FIG. 6), initial set up procedures to, for example, select the scan length and scan step, the user then, via the user interface 31 (FIG. 6), carries out preliminary procedures, that is: causes the sample support stage 9 to be moved under the control of the control apparatus 30 in the XY plane to bring the surface area to be scanned into the field of view of the detector 10; adjusts the coarse Z position until fringes are visible to set the start position for the scan; and then adjusts the tilt of the stage 9 to produce near-minimum fringe densities to ensure that the sample surface is parallel to the reference mirror, as discussed above. As another possibility, the coarse Z positioning may be carried out manually by the user. Also it may be possible to carry out the tilt adjustment automatically by use of fringe contrast information.

The user then instructs the interferometer system 2, via the user interface 31, to carry out a scan of a surface area. At S2 the controller 21 may cause the user interface to prompt the user to identify, via the user interface, whether the surface area to be scanned is a structure surface area 81 or a non-structure surface area 83, and to confirm that the above preliminary procedures have been carried out, that the appropriate scanning conditions are being used, for example that a low numerical aperture objective lens is in place (if the apparatus is capable of using different numerical aperture objective lenses), and that the light level is the same as for the previous scan if this is the second of the two measurement operations, and to input pitch data for the structure surface area 81, if this information is not already present in the pitch provider 110.

Assuming the user inputs the necessary confirmation and provides the pitch data, then at S3 the controller 21 causes the interferometer system 2 to commence scanning of the surface area to carry out the measurement operation. The controller 21 also communicates with the structure determiner controller 200 to store the pitch data in the pitch data provider 110. The controller 21 may keep the user informed as to the progress of the scan by displaying a message or graphical representation indicating the progress of the scan in a user dialogue window on a display of the user interface 31.

Once the scan of the surface area has been completed, the controller 21 checks at S4 whether another scan is to be required. If the user has so far only instructed scanning of a structure surface area 81 or a non-structure surface area 83 but not both, then the controller 21 repeats S2 and S3 prompting the user, via the user interface 31, at S2 to cause the other surface area to be placed in the field of view, to carry out the preliminary procedures and checks, including confirming that the illumination setting is, as is required, the same as for the previous measurement operation, readjusting the coarse Z position to ensure that the interference fringes are visible in the image displayed in the window 201 and readjusting the tilt of the stage 9 to produce near-minimum fringe densities to ensure that the non-structure sample surface 83 is parallel to the reference mirror, before instructing the apparatus to carry out the second measurement operation.

Figure 10:
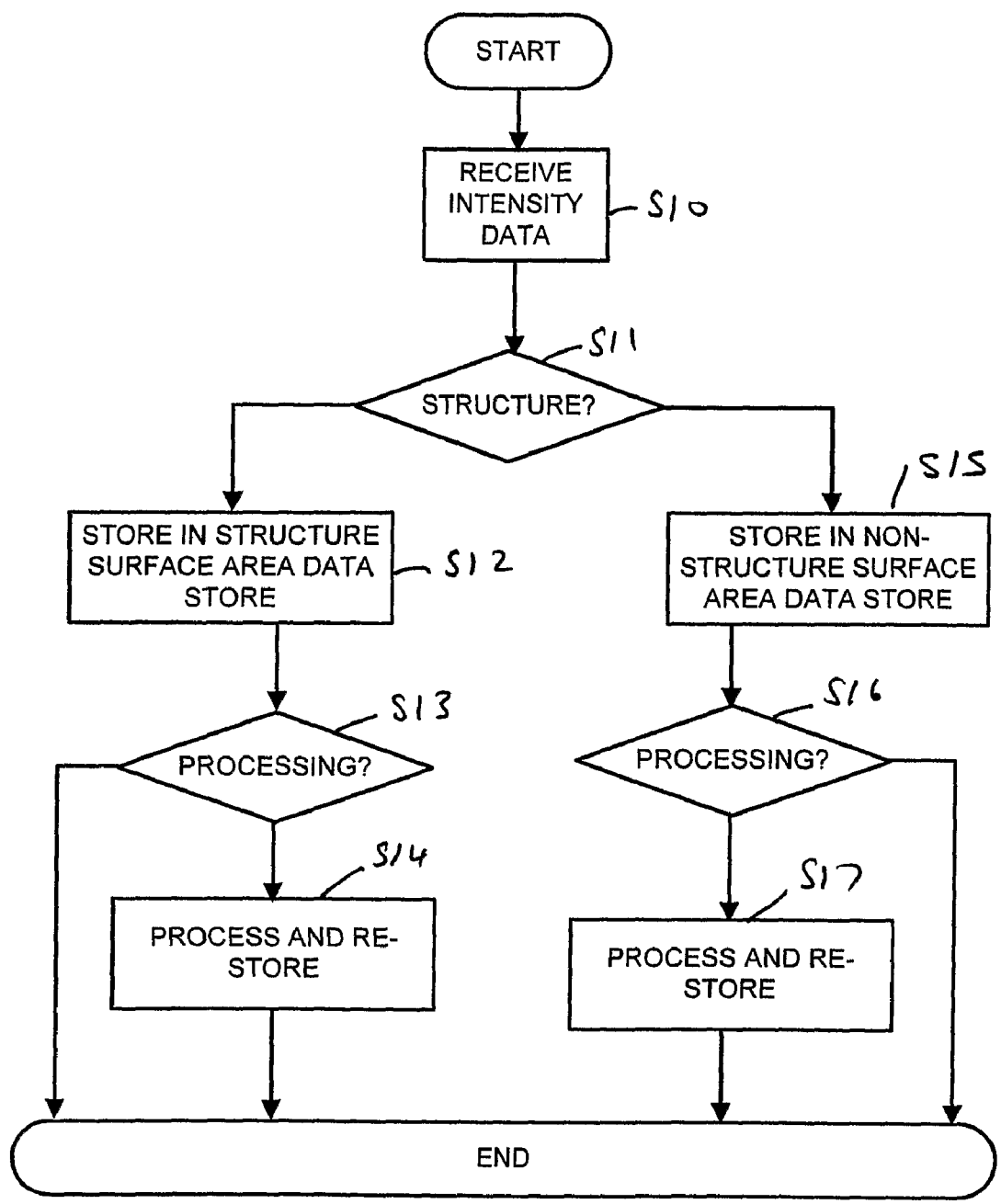

FIG. 10 shows operations carried out by the structure determiner 100. Thus, when at S10 a frame of image data is received from the interferometer system by the intensity data receiver 33, the controller 200 determines (from information provided by the user to the controller 21) at S11 whether the intensity data is structure surface or non-structure surface intensity data. If the intensity data is structure surface intensity data, then at S12, the controller 200 instructs the intensity data storer 101 to store the intensity data in a section of the structure surface intensity data store 103 for that frame. If the intensity data is non-structure surface intensity data, then at S15, the controller 200 instructs the intensity data storer 101 to store the intensity data in a section of the non-structure surface intensity data store 103 for that frame.

It will be appreciated that the structure surface and non-structure surface areas may each be evaluated either at individually selected pixels or, to improve the signal-to noise, using averaged intensity data corresponding to a small region of pixels (for example a 2 surface pixel by 2 surface pixel region). Thus, for example, processing of either set of intensity data may be requested by the structure determiner controller 200 at S13 and S16. If processing is requested, then the intensity data processor 104 will process the corresponding intensity data and re-store the processed intensity data in a section of the corresponding intensity data store 102 or 103 for processed data for that frame at S14 or S17 as the case may be. For example, the intensity data processor 104 may process the data by averaging the intensity data over a number of adjacent surface pixels to improve the signal to noise ratio for the non-structure surface area. As another possibility dependent upon the sensing device, it may be possible for the averaging process to be carried out by the sensing device (for example using a "binning" procedure), rather than by the data processor.

The steps shown in FIG. 10 are repeated for each frame of image data for each scan.

Once the scans of the structure surface and non-structure surface areas have been completed, then the intensity data storer 101 will have stored the structure surface intensity data in the structure surface data store 102 and the non-structure surface intensity data in the non-structure surface data store 103.

When the controller 21 informs the user via the user interface that the scan of the second surface area has been completed and any appropriate processing carried out a S14 and/or S17, then the user can elect to begin processing the acquired data. If the user has not already input the pitch data, then the controller 21 will again prompt the user for this data and cause it to be stored by the pitch provider 110 (FIG. 6).

Once the controller 21 determines that the pitch data has been provided, then the controller 21 instructs the structure determiner 100 to commence determination of the structure of the structure surface area 81, in particular the size (height or depth) H and width $x_w$ of the surface structure elements 82.

Figure 11:
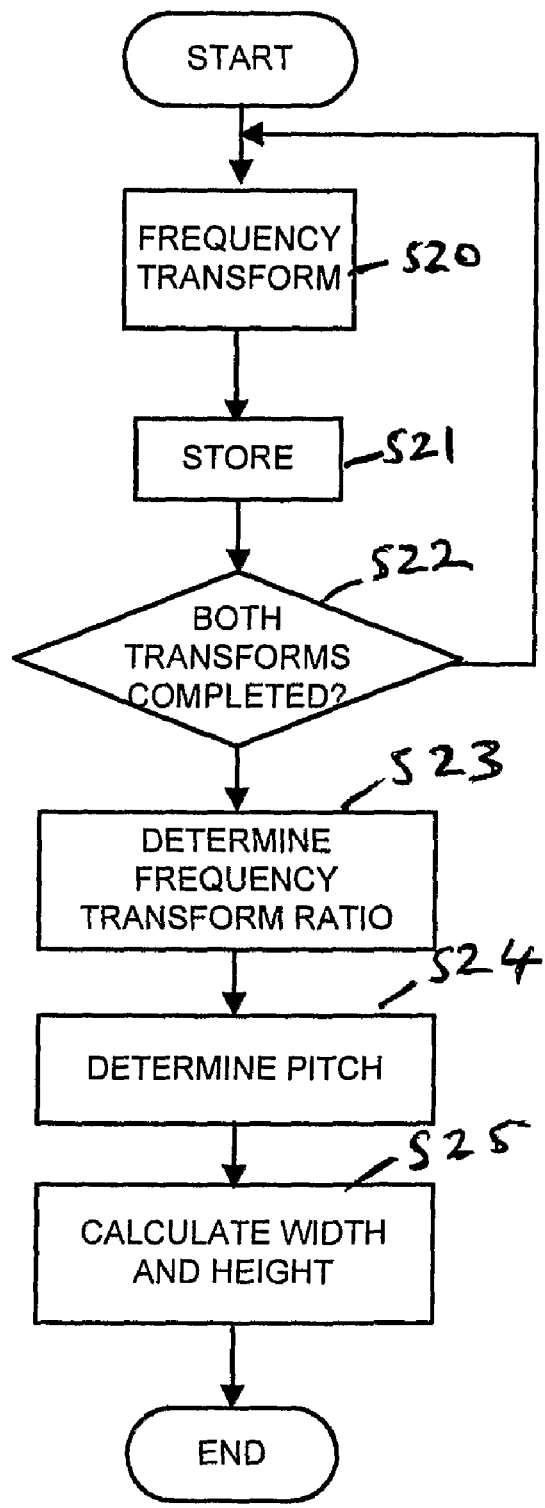

FIG. 11 shows a flow chart for illustrating determination of the structure of the structure surface area 81. Thus, at S20, the structure determiner controller 200 instructs the frequency transformer 106 to determine the frequency transform of the intensity data for a selected surface pixel (or of the averaged intensity data for a set of pixels) by, in this example, carrying out at S20 a Fast Fourier Transform (FFT) process on the intensity data, and at S21 instructs the frequency transformer 105 to store the frequency transform data in the appropriate one of the structure frequency transform data store 106 and the non-structure frequency transform data store 107. The well-known ($2^n$) FFT may be used, although other forms of Fourier transform such as the Winograd Fourier transform (which is not based on powers of 2) could be used.

The structure determiner controller 200 then checks whether the frequency transformer 105 has carried out the frequency transformation process on both sets of data and if not causes processes S20 and S21 to be repeated for the other data set. Then at S23, the structure determiner controller 200 causes the ratio determiner 110 to determine the ratio of the positive side bands of the frequency transforms, that is to determine the HCF($\upsilon$) ratio set out above. In practice the positive sideband is defined by insisting that the component Fourier (positive frequency) amplitudes exceed a given threshold. Once the HCF($\upsilon$) ratio has been determined, then at S24 in FIG. 10, the structure determiner controller 200 causes the structure provider 109 to access the pitch data in the pitch data provider 110 and at S25 to calculate the surface structure element width $x_w$ and size (height or depth) H.

The structure provider 109 calculates the surface structure element width $x_W$ and size (height or depth) H by, as described above, relating the frequency ratio or HCF function equal to a relationship defining the conjugate of the electric field E(x, y, ν) in the image plane of the interferometer objective in terms of the surface structure element size (height or depth) H and a ratio β between the surface structure element width and pitch as explained above with reference to equations 34 to 44.

As a first step, the structure provider 109 prompts the user to input data indicating whether there is expected to be a height difference $\Delta z_{HCF}$ between the structure surface area 81 and the non-structure surface area 83. Generally the user will indicate that $\Delta z_{HCF}$ is equal to zero only if the structure surface area 81 and the non-structure surface area 83 are respective areas of the same sample and the sample is such that the user knows that there is no surface height difference between the top surface 7 of the structure surface area 81 and the non-structure surface area 83, otherwise the structure provider 100 will assume $\Delta z_{HCF}$ is not equal to zero. The user may determine the surface heights of the structure surface area 81 and the non-structure surface area 83 by, when carrying out the measurement operations required by the structure determiner 100, also instructing the apparatus to carry out measurement operations required by the surface height determiner 101a on the non-structure surface area 83 and the top surface 7 of the structure surface area 81 and causing the surface height determiner 101a of the data processor 32 to determine their respective heights and any difference therebetween. The surface height determiner 101a may function in known manner to determine surface height, for example in the manner discussed in the Lee & Strand paper above or in the manner described in WO03/078925, the whole contents of which are hereby incorporated by reference. The user may also be asked to advise whether the expected width of the surface structure elements is comparable to is the nominal mean wavelength λ of the broadband source 4.

The user is prompted to indicate whether the structure surface area and non-structure or reference surface area are of the same material. If the materials differ, the user is prompted to enter data identifying the materials enabling the structure provider to evaluate the net reflected fields (r(ν) and $r_{ref}$(ν)) at the same set of frequencies for which the HCF ratio is defined by using data from a data bank of dispersive material data and knowledge of the objective numerical aperture.

If the structure determiner controller 200 determines from data supplied by the user or the surface height determiner 100a that $\Delta z_{HCF}$ is zero, the structure provider 109 sets the net reflectance field, E(ν), equal to the conjugate of the HCF ratio. The structure provider 109 then sets the real and imaginary parts of the unity reflectance field, E(ν)/r(ν), equal to the relationships shown in equations 34 and 35 so that:

Re(E(ν)/r(ν))=1−β+β cos 4πνH

Im(E(ν)/r(ν))=β sin 4πνH

The structure provider 109 then calculates β=1−DC and H=1/(2P) where P is the mean dominant period of the AC component of the HCF function and DC is the DC offset of the HCF function. As discussed above, the structure provider 109 may calculate or determine the trench depth or height H by using frequency domain analysis, in this example Fourier analysis, to determine the dominant frequency and thus the dominant period P and then calculating H=1/(2P) while the structure provider 109 may calculate or determine β by determining the mean of the real part of the HCF function to obtain the DC offset and then calculating β=1−DC.

Also as discussed above, as another possibility, especially if the frequency analysis does not show a dominant frequency, then the structure provider 109 may use a fitting procedure such as a conjugate gradient method or a simulated annealing method in which the structure provider 109 sets the real and imaginary parts of the unity reflectance field, E(ν)/r(ν), equal to the right hand side of equations 34 and 35 (or in this case where $\Delta z_{HCF}$ equals zero to the conjugate of the HCF function) and modifies β and H from initial guesses provided by the user, until a best fit is determined on the basis of a merit function. The structure provider 109 then calculates $x_w$ as being $βx_p$, using the pitch $x_p$ provided by the pitch provider 110.

If the structure determiner controller 200 determines from data supplied by the user or the surface height determiner 100a that $\Delta z_{HCF}$ is not equal to zero, then, after the user has been prompted to indicate whether the analysis is to be along a column (centred at x-pixel j and of length $N_y$), a row (centred at y-pixel k and of length $N_x$) or a rectangular region (centred at x-pixel j, y-pixel j and of row and column lengths respectively of $N_x$ and $N_y$) the structure provider 109 initially generates the mean electrical field as in equations 36, and 37:—

$$\overline{E}_k(\nu) = \frac{1}{N_x}\sum_{j=1}^{N_x}\begin{pmatrix} \cos 4\pi\nu\begin{pmatrix}\Delta z_{structure} - \\ \Delta z_{non\text{-}structure}\end{pmatrix}_{jk} & \sin 4\pi\nu\begin{pmatrix}\Delta z_{structure} - \\ \Delta z_{non\text{-}structure}\end{pmatrix}_{jk} \\ -\sin 4\pi\nu\begin{pmatrix}\Delta z_{structure} - \\ \Delta z_{non\text{-}structure}\end{pmatrix}_{jk} & \cos 4\pi\nu\begin{pmatrix}\Delta z_{structure} - \\ \Delta z_{non\text{-}structure}\end{pmatrix}_{jk} \end{pmatrix}$$

$$\begin{pmatrix} Re(HCF_j(\nu)) \\ -Im(HCF_j(\nu)) \end{pmatrix}$$

$$\overline{E}_j(\nu) = \frac{1}{N_y}\sum_{k=1}^{N_y}\begin{pmatrix} \cos 4\pi\nu\begin{pmatrix}\Delta z_{structure} - \\ \Delta z_{non\text{-}structure}\end{pmatrix}_{jk} & \sin 4\pi\nu\begin{pmatrix}\Delta z_{structure} - \\ \Delta z_{non\text{-}structure}\end{pmatrix}_{jk} \\ -\sin 4\pi\nu\begin{pmatrix}\Delta z_{structure} - \\ \Delta z_{non\text{-}structure}\end{pmatrix}_{jk} & \cos 4\pi\nu\begin{pmatrix}\Delta z_{structure} - \\ \Delta z_{non\text{-}structure}\end{pmatrix}_{jk} \end{pmatrix}$$

$$\begin{pmatrix} Re(HCF_j(\nu)) \\ -Im(HCF_j(\nu)) \end{pmatrix}$$

The structure provider then sets the real and imaginary parts of the mean unity-reflectance electrical field, $\overline{E}(\nu)/r(\nu)$, equal to the relationships shown in equations 39a/39b and 40a/40b respectively Re($\overline{E}_k$(ν)/r(ν))=1−$β_y$+$β_y$ cos 4πν$H_y$ Im($\overline{E}_k$(ν)/r(ν))=$β_y$ sin 4πν$H_y$ (for the row)

Re($\overline{E}_j$(ν)/r(ν))=1−$β_x$+$β_x$ cos 4πν$H_x$

Im($\overline{E}_j$(ν)/r(ν))=$β_x$ sin 4πν$H_x$ (for the column)
and then determines H and p in the same manner as described above for the case where $\Delta z_{HCF}$ equals to zero.

Where the structure determiner controller 200 determines from data supplied by the user that the width of the surface structure elements 82 is comparable to the nominal mean wavelength $λ_o$ of the broadband source, that is $x_w$∼λ or that there is a significant aspect ratio ($H/x_w$) then the structure determiner controller 200 causes the structure provider 109 to modify the calculations by the parameter α representing the absorption loss as set out in equations 42 and 43 above for $\Delta z_{HCF}=0$ and $\Delta z_{HCF} \neq 0$, respectively. calculates β=1−DC and H=1/(2P) where P is the mean dominant period of the AC component of the unity reflectance electrical field and DC is the DC offset of the unity reflectance electrical field. If the absorption coefficient is significant, then the Fourier amplitude and frequency FWHM (Full Width Half Maximum) will be insufficient to determine H so the approach represented in equation 44 above is used instead:

$$\tan 4\pi vH = \frac{\text{Im}\left(HCF(v)\frac{r_{ref}(v)}{r(v)}\right)}{\beta - 1 + \text{Re}\left(HCF(v)\frac{r_{ref}(v)}{r(v)}\right)}$$

together with the amplitude weightings for each of the individual frequency estimates of H:

$$w(v) = \beta^2 e^{-2\alpha(v)H}$$

Also as discussed above, as another possibility, especially if the frequency analysis does not show a dominant frequency, then the structure provider 109 may use a fitting procedure such as a conjugate gradient method or a simulated annealing method in which the structure provider 109 sets the real and imaginary parts of the unity reflectance field, $E(v)/r(v)$ equal to the right hand side of equations 42 and 43 and modifies β and H from initial guesses provided by the user, until a best fit is determined on the basis of a merit function. The structure provider 109 then calculates $x_w$ as being $\beta x_p$, using the pitch $x_p$ provided by the pitch provider 110.

The structure determiner controller 200 may cause the frequency transformer 106, ratio determiner 110 and structure provider 100 to repeat the above procedures for a number of further surface pixels of the stored intensity frames and/or the user may instruct the apparatus to carry out further scans on different surface areas of the sample under test to obtain further values for β and H. If this optional procedure is carried out, then, when it is completed, the structure determiner controller 200 may instruct the structure provider 109 to average the obtained β and H values.

The user can then repeat the above procedure for other samples, if desired.

The detector 10 may exhibit photon noise so requiring the application of noise reduction techniques to the extracted HCF function or ratio. For any real surface, there will inevitably be a variation in the correlation data sets that are produced through the action of stepping (or scanning) the objective lens/sample surface distance while storing interferograms at regular intervals. These correlation differences are due to (i) the intrinsic surface form (including surface roughness) together with (ii) the fact that the surface is very likely to be tilted with respect to the reference mirror. Any known noise reduction technique that takes these correlation differences into account may be used.

It has been demonstrated by computer simulation that, over a wide range of numerical aperture values, there is close agreement between the moduli of $E(\upsilon)$ and $HCF(\upsilon)$. This close agreement is understood to be due essentially to the common mode rejection of defocus effects within $HCF(\upsilon)$.

FIGS. 12 to 17 show various graphs for illustrating the HCF function.

Figure 12:
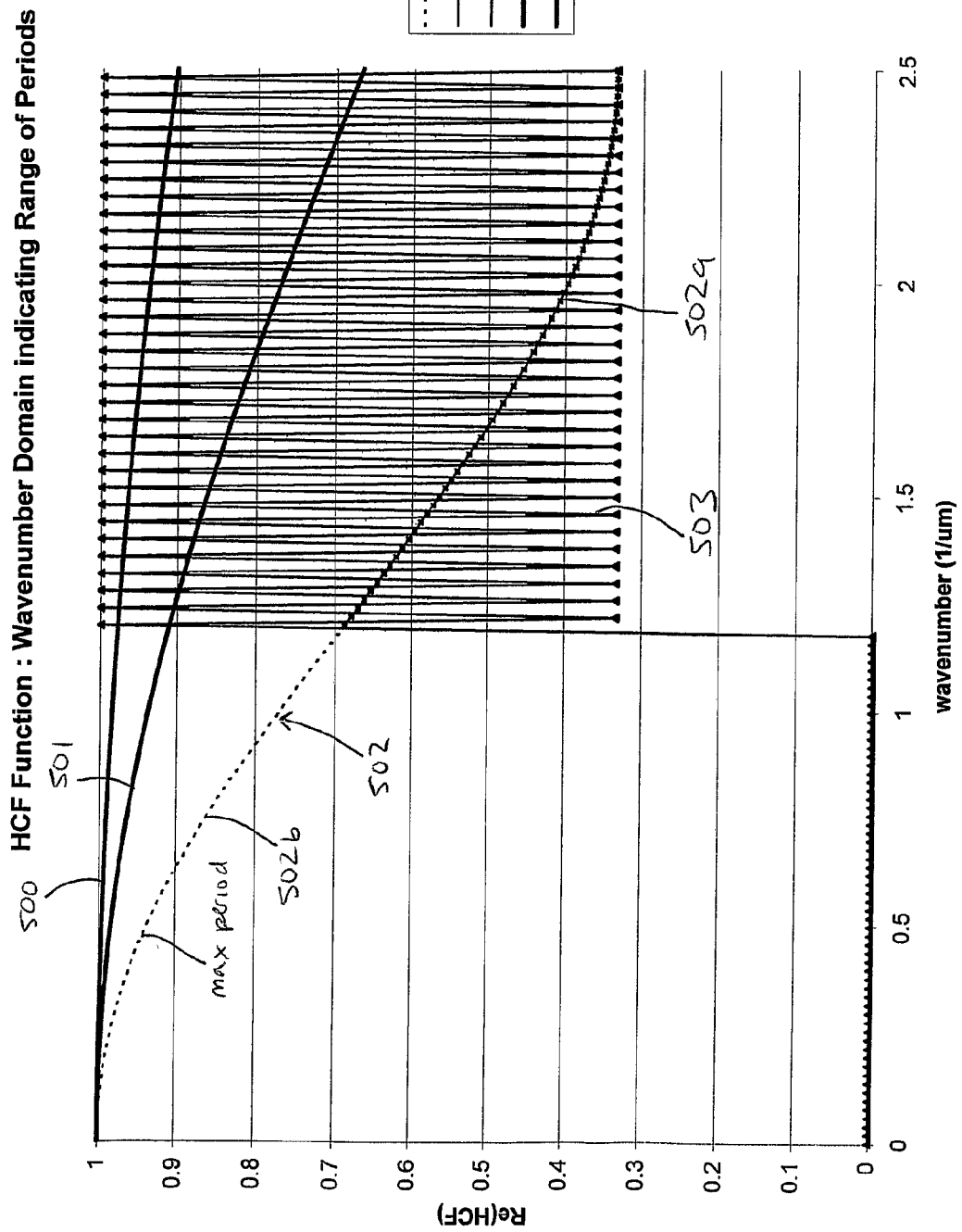
FIG. 12 shows a graph representing the relationship between a frequency transform ratio or HCF function and wavenumber.

FIG. 12 shows a graph of HCF function against wavenumber (1/micrometres) in which the lines labelled 500 and 501 show the relationship between the HCF function and wavenumber for 50 nm (nanometre) and 25 nm trenches respectively (with a 1 µm pitch). The part 502a of the line 502 marked with squares represents the component of the HCF function lying within the instrument bandwidth for a 100 nm deep trench while the remainder 502b of that line represents the corresponding continuation of the HCF function beyond the bandwidth of the instrument; the period of the HCF function corresponds approximately to the maximum period capable of resolution so that such a depth corresponds approximately to the minimum. The sinusoidal line 503 marked with triangles represents the Nyquist period.

FIGS. 13 to 17 show various graphs relating to the HCF function for a simulated unity-reflectance substrate with an array of 4.5 µm (micrometre) deep trenches with β=0.3 (trench width $x_w$ of about 0.45 µm and a trench pitch $x_p$, of about 1.5 µm) where the interferometer system provides a positive sideband frequency of v+ of about 2.5 µm$^{-1}$ and a negative sideband frequency v− of about 1/0.8 µm$^{-1}$ with an absorption parameter $\alpha = \alpha_o(v_o/v)^2$ where $v_o$2 µm$^{-1}$ and is the frequency of the nominal wavelength of the interferometer.

Figure 13:
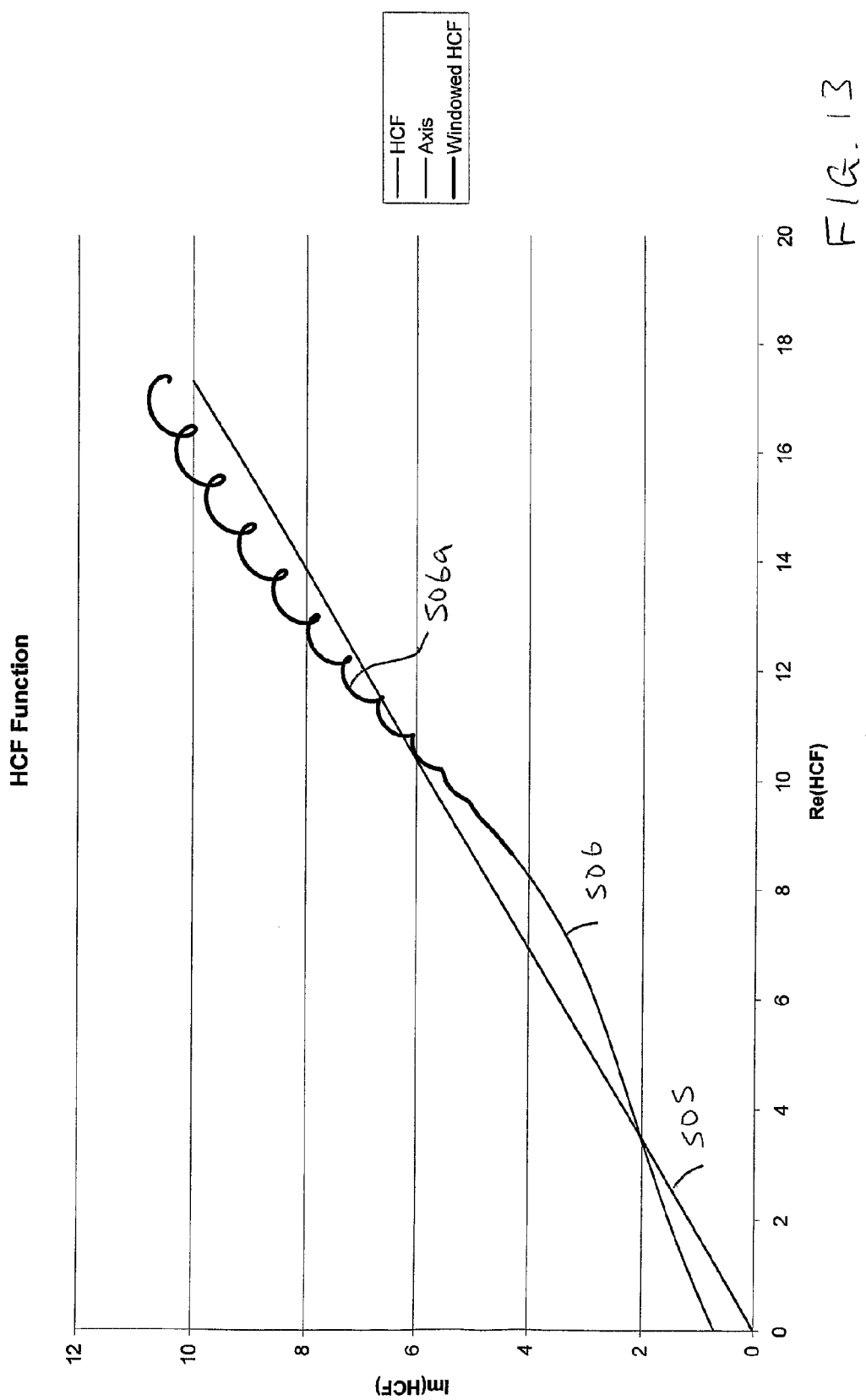
FIGS. 13 to 17 show graphs relating to the HCF function.

FIG. 13 has x and y axes corresponding to the imaginary and real components of the HCF function and a third axis (line 505) representing frequency. This figure shows the shows the theoretical HCF function (line 506) and in particular that component of the HCF function, the 'windowed HCF' that lies within the instrument bandwidth. This is the coiling or looping part 506a.

Figure 14:
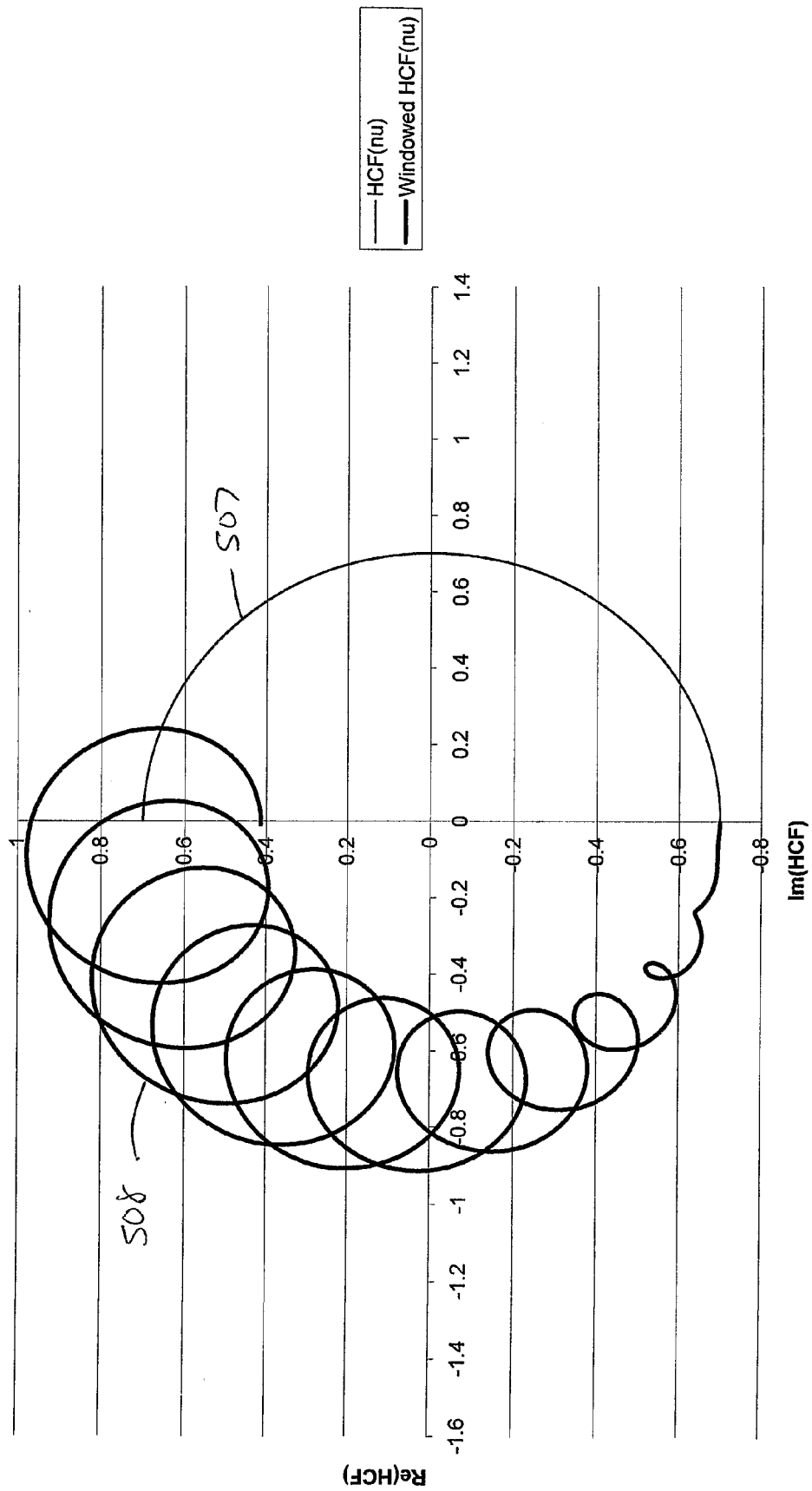

FIG. 14 shows the same data as FIG. 13 but from an axial view. The real part Re(HCF) is plotted against the imaginary part Im(HCF) of the HCF function with the curve 507 representing the HCF(v) and the component 508 representing that component of the HCF function, the 'windowed HCF' that lies within the instrument bandwidth; this is the helical or spiraling component.

Figure 15:
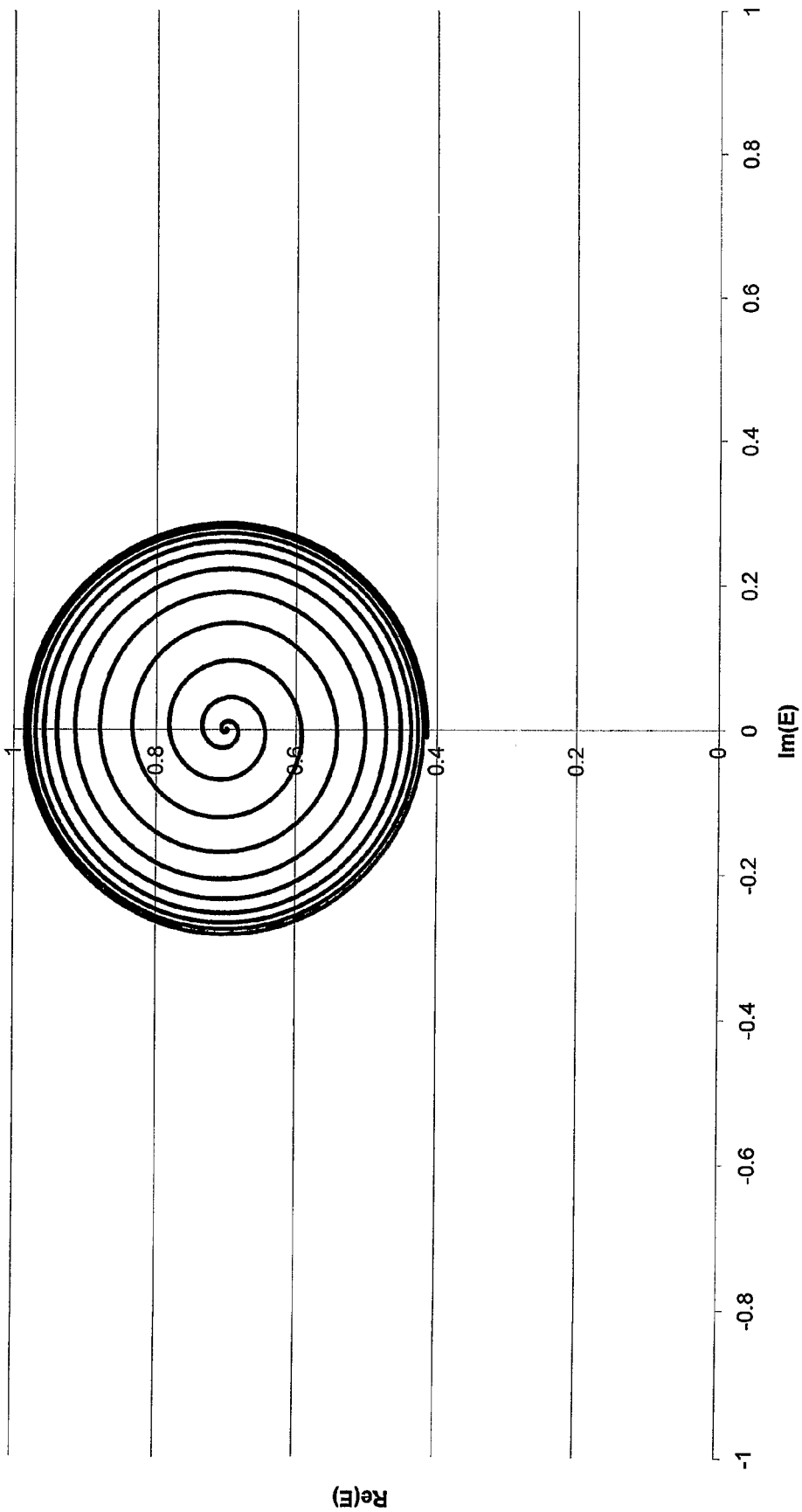

FIG. 15 shows a graph (corresponding to the same data as FIGS. 13 and 14) of the real part Re(E) against the imaginary part Im(E) in which the rotation matrix in equation 36 has been applied (with $N_x=1$) to correct the HCF function.

Figure 16:
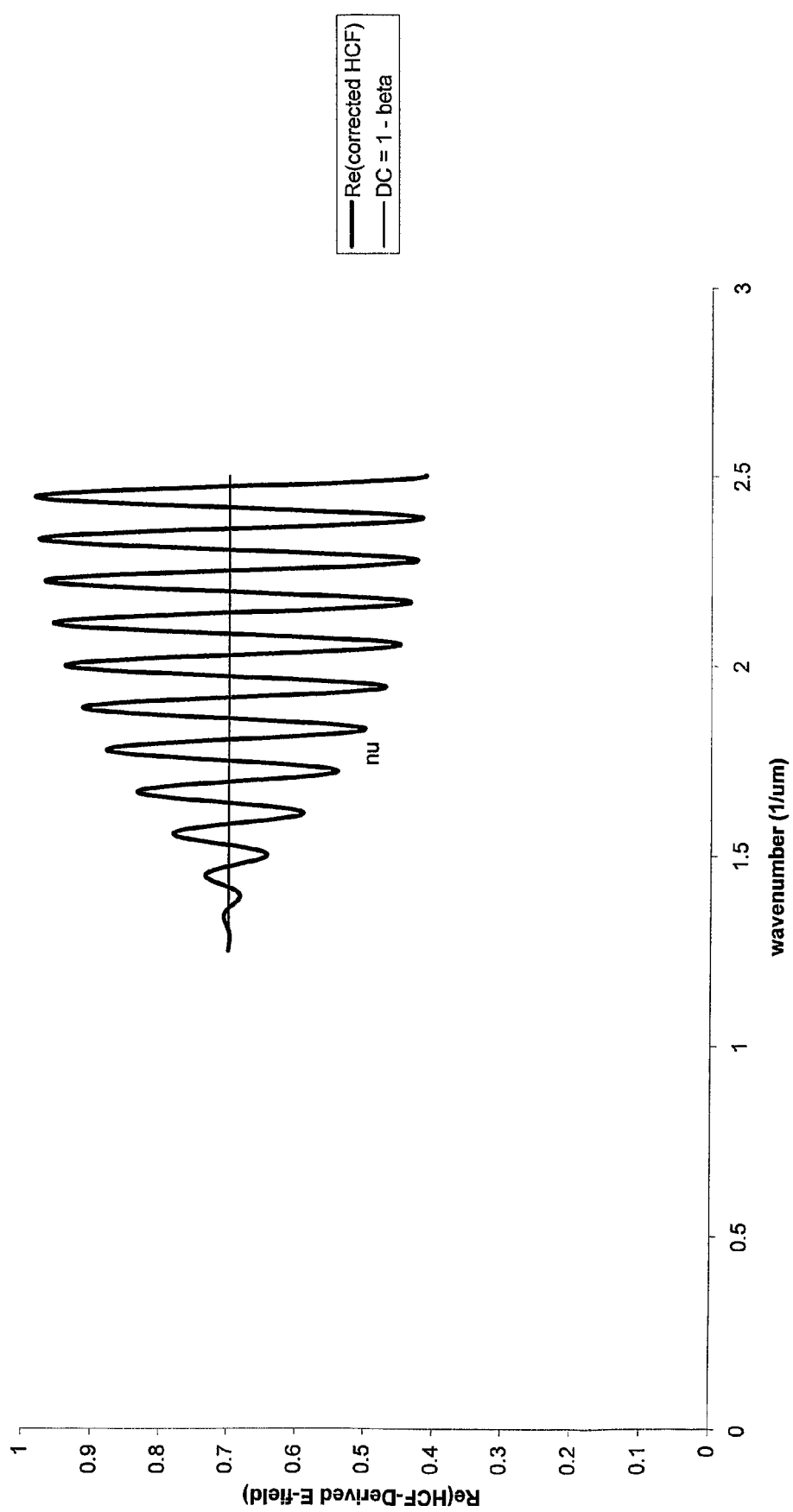
Figure 17:
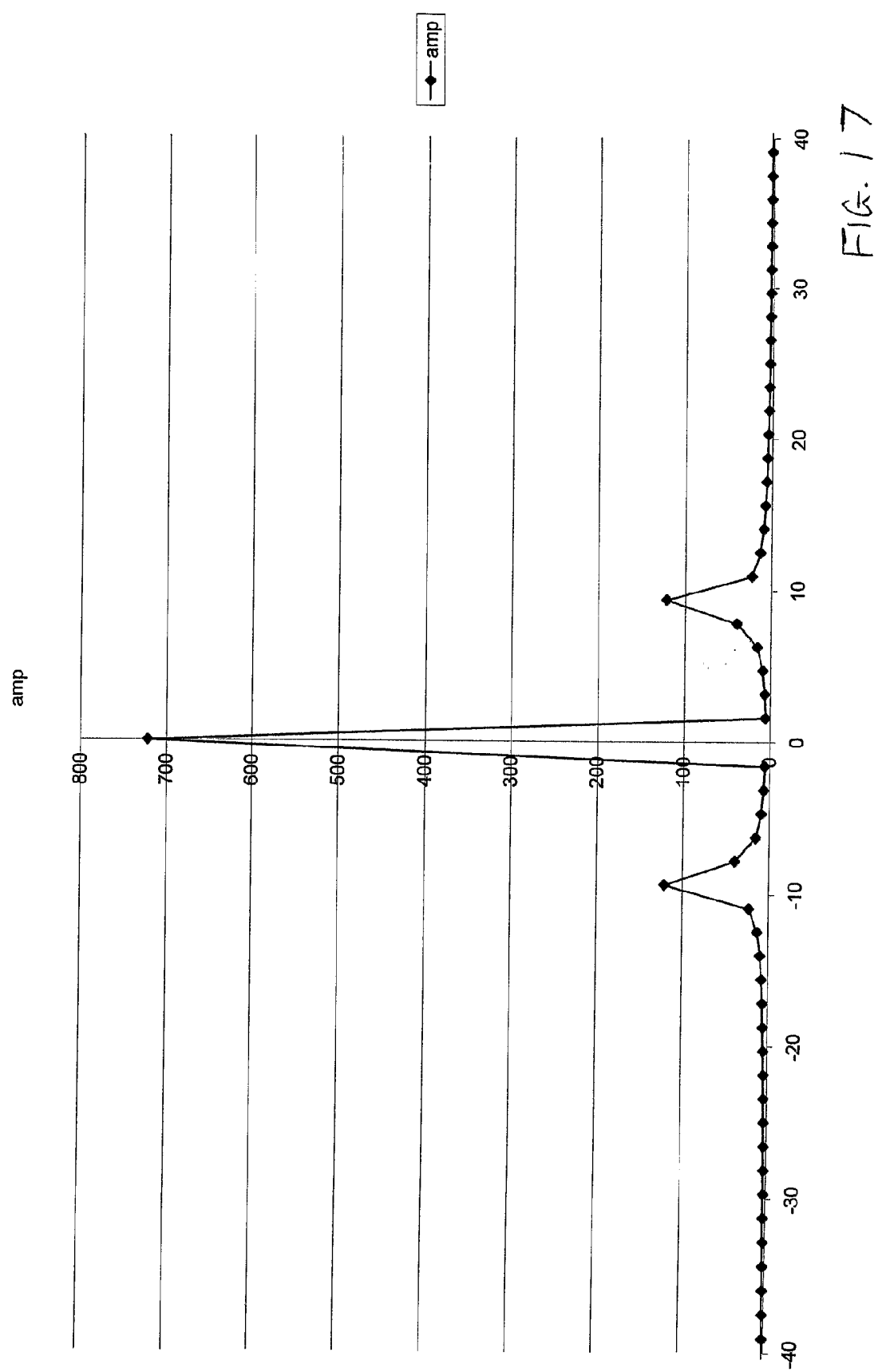

FIG. 16 shows a graph of the real part Re(E(v)/r(v)), (where r(v)=1) corresponding to the same data set as in FIGS. 13, 14 and 15 against wavenumber; the line 509 represents the DC bias DC from which β (=1−DC) and hence $x_w$ can be determined and the oscillatory line 510 representing the real part of E(v)/r(v). The period P of the oscillatory line 510 gives the trench height or depth (H=1/(2P)) and can be determined by taking the Fourier transform of the real part of E(v)/r(v).

For the same data set as in FIGS. 13, 14, 15 and 16, FIG. 17 shows a graph of amplitude against nu(period) in micrometres for the FFT of the real part of E(v)/r(v) from which H=½·nu(peak)=4.5 micrometres.

Although as described above the structure determiner 100 is arranged to process the stored intensity data for one surface pixel at a time, if sufficient processing power is available, the layer structure determiner 100 may process intensity data for different surface pixels in parallel. It may also be possible to carry out the frequency transformation processes in parallel for the structure and non-structure surface areas 82 and 83. It may be possible to use other frequency transforms:

As described above, the surface structure elements comprise trenches or grooves. As another possibility, the surface structure elements may comprise walls upstanding on the surface. As another possibility, the surface structure elements may comprise vias, pits or mesas.

As described above, apparatus and a method embodying the invention enable the width-to-pitch and size (height or depth) of an array of surface structure elements in one direction (a 1D array) to be determined.

The present invention may be extended to a 2D array. Thus, the simple weighted phasor behaviour of equation 31 implies that for a 2D structure consisting of say trenches of depth $H_y$ orientated in the y-direction $\beta_y = x_{wy}/x_{py}$ together with say trenches of depth $H_x$ orientated in the x-direction $\beta_x = x_{wx}/x_{px}$, then:

$$\overline{E}(\nu) \cong r(\nu)((1-\beta_x)(1-\beta_y)+(1-\beta_x)\beta_y e^{+i4\pi\nu H_y}+(1-\beta_y)\beta_x e^{+i4\pi\nu H_x}) \quad 32a)$$

Such a 2D array may have the same or different pitches in the two directions (x and y in FIGS. 7 and 8). It may also be possible to apply the present invention where the pitch varies or where the surface structure elements are in an irregular but known (for microscope measurements, for example) arrangement.

As described above, apparatus and a method embodying the invention enable the width-to-pitch and size (height or depth) of a plurality of surface structure elements to be determined. Apparatus and a method embodying the invention may also be used to determine the size (height or depth) of a single surface structure element.

As described above, the structure surface area and the non-structure surface area need not necessarily be areas of the same surface, provided that the different surfaces are leveled before measurement and the illumination does not vary. Any difference in height between the surface 7 of the structure surface area and the non-structure surface area should, of course, lie in the measurement range of the apparatus.

It is preferred that the structure surface area and the non-structure surface area are formed of the same material. However, this need not necessarily be the case, provided the frequency transform ratio (the HCF function above) is modified to take account of the dispersive properties of the different materials. Similarly, although it is preferred that the sidewalls and bottom (in the case of a groove, trench or via) or top (in the case of a wall or mesa) are formed of the same material. However, this need not necessarily be the case, provided the frequency transform ratio (the HCF function above) is modified to take account of the dispersive properties of the different materials.

Generally, ignoring the structure elements, the structure surface area and the non-structure surface area will both be planar, for example optically flat. However, this need not necessarily be the case and one or both of the structure surface area and the non-structure surface area may have surface form, in which case a known surface form fitting and removal procedure may need to be carried out.

As described above, the frequency transform ratio is the HCF function provided by the ratio of the positive sidebands. As another possibility, the frequency transform ratio may be provided by the ratio of the negative sidebands, that is an HF (Helical Field) function, rather than an HCF (Helical Conjugate Field) function, in which case it will be the electric field rather than its conjugate that is related to the frequency transform ratio. Given that for the negative frequency sideband, the Fourier transform of a real function is the conjugate of the positive arm Fourier component, if the HCF function itself is defined over the negative frequency sideband, it is simply the conjugate of the described HCF function.

The above described techniques may be applied where the surface structure elements have sloping sidewalls although these may give rise to a small error in β and therefore in $x_w$.

The above description assumes that the spectral range of light source is in the visible. It could, however, extend into or lie within the infra red or ultra violet regions of the spectrum.

Figure 18:
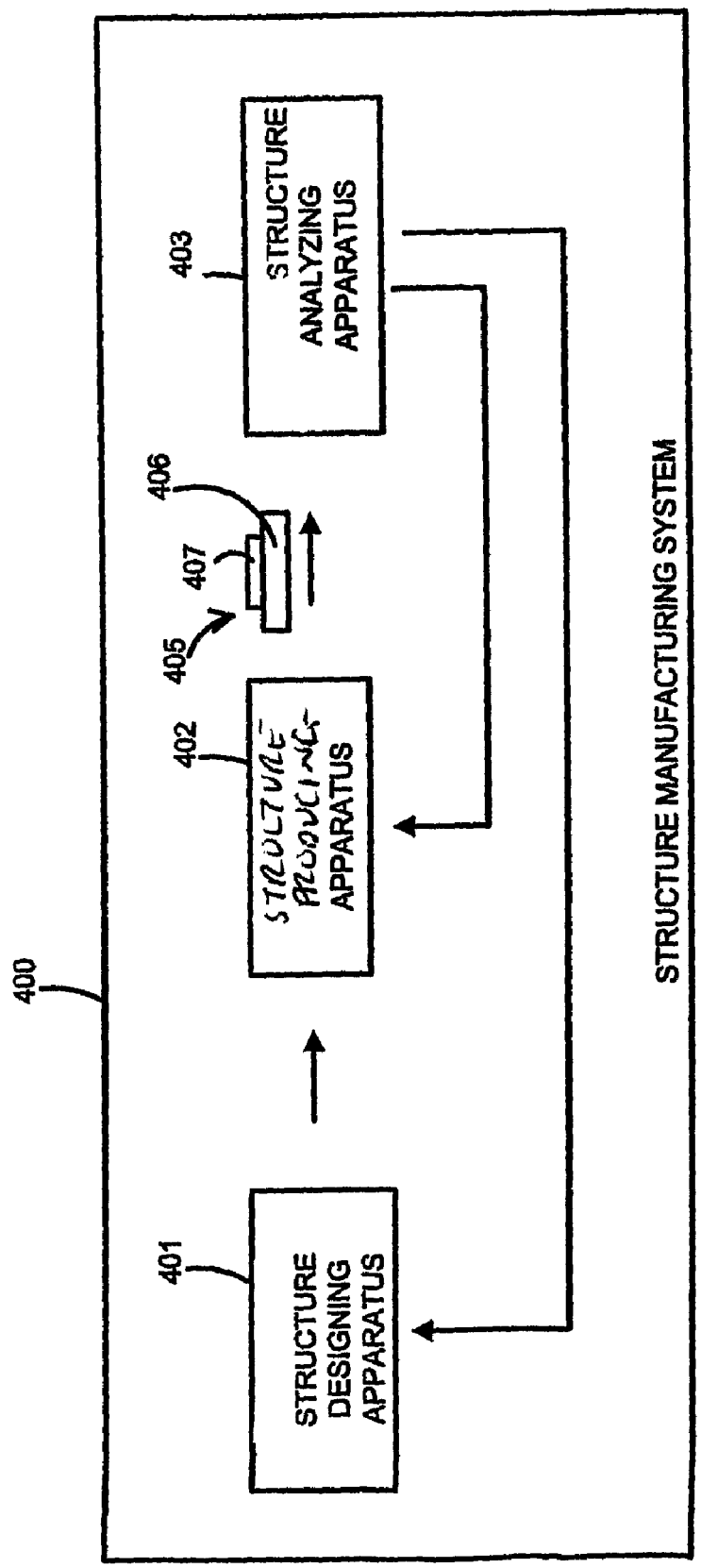
FIG. 18 shows a simplified block diagram of a manufacturing system.

The apparatus described above may form part of a structure manufacturing system. FIG. 18 shows a simple block diagram of a manufacturing system 400 comprising structure designing apparatus 401 that may be provided by any one or more of: hardwired circuitry, firmware, digital signal processors, one or more application specific integrated circuits (ASIC), or programming of one or more processors or by any combination of these. The structure designing apparatus 401 is configured: to receive input from a user or operator identifying the features required of the structure such as the required height or depth, pitch and width of the surface structure elements; and to determine how a producing apparatus should be controlled to produce that structure, for example to determine a mask pattern and etch process conditions required to produce that structure. The structure designing apparatus 401 provides control instructions for enabling a producing apparatus 402, such as an etching and/or deposition apparatus, to cause the structure to be formed on the required substrate. The producing apparatus 402 may be configured to carry out any form of etching and/or deposition process suitable to form the surface structure elements, for example a chemical vapour deposition process and/or a reactive ion etch. Once the surface structure elements have been formed on the substrate, the resulting product is passed to a structure analysing apparatus 403 which is constructed and operates as described above with reference to FIGS. 1 to 11 to determine the structure. Once the structure analysing apparatus 403 has determined the structure as described above, it may provide control information for at least one of the structure designing apparatus 401 and the producing designing apparatus 402 to enable the designing and/or producing process to be modified in accordance with the results of the structure analysis by the structure analysing apparatus 403.

It is to be understood that any feature described in relation to a particular embodiment may be used alone, or in any combination with any other described feature, and may also be used in combination with any feature or combination of features of any other described embodiment. Equivalents and modifications not described above may also be employed without departing from the scope of the invention which is defined in the following claims.

The invention claimed is:
1. Apparatus for determining information relating to a sample surface structure, the apparatus comprising:
a light director operable to direct light along a sample path towards a region of a surface of a sample and along a reference path towards a reference surface such that light reflected by the region of the sample surface and light reflected by the reference surface interfere, the light director being capable of providing light having a point spread function with a spread at a sample surface greater than a pitch of surface structure elements providing a surface structure of the sample;
a mover operable to effect relative movement along a measurement scan path between a sample and the reference surface;
a sensing device operable to sense light representing interference fringes produced by a sample surface region during relative movement along the measurement scan path;
a controller operable to carry out a measurement operation by causing the mover to effect relative movement while the sensing device senses light intensity at intervals to provide a series of intensity values representing interference fringes produced by a sample surface region during the relative movement; and a data processor operable to receive and process i) structure intensity data comprising a set of intensity values resulting from a measurement operation on a structure surface sample area using light with a point spread function having a spread at the sample surface greater than a pitch of surface structure elements providing the surface structure of the structure surface sample area, and ii) non-structure intensity data comprising a set of intensity values resulting from a measurement operation on a non-structure surface sample area not having the structure, the data processor comprising:
a frequency transform ratio determiner operable to determine a frequency transform ratio corresponding to a ratio between the structure and non-structure intensity data; and
a structure provider operable to relate the frequency transform ratio to a relationship involving a first structure measure representing a ratio between the width and pitch of the surface structure elements and a second structure measure representing the size of the surface structure elements in a direction transverse to the sample surface so as to enable determination of a value for at least one of said first and second structure measures.

2. Apparatus according to claim 1, wherein the frequency transform ratio determiner comprises a frequency transformer operable to determine first frequency transformed data corresponding to the structure intensity data and second frequency transformed data corresponding to the non-structure intensity data and a ratio determiner operable to determine the frequency transform ratio by dividing one of the first and second frequency transformed data by the other of the first and second frequency transformed data.

3. Apparatus according to claim 1, wherein the ratio determiner is operable to determine $$\frac{\mathscr{F}_{structure}(I(Z_k))_{SB}}{\mathscr{F}_{non\text{-}structure}(I(Z_k))_{SB}}$$

where $\mathscr{F}_{structure}(I(Z_k))_{SB}$ is a side band of the frequency transform of the structure intensity data and $\mathscr{F}_{non\text{-}structure}(I(Z_k))_{SB}$ is the corresponding side band of the frequency transform of the non-structure structure intensity data.

4. Apparatus according to claim 3, wherein the ratio determiner is operable to modify the ratio by a net electric field reflectance term or its conjugate.

5. Apparatus according to claim 1, wherein the ratio determiner is operable to determine $$r_{ref}^+(v)\frac{\mathscr{F}_{structure}(\gamma(X_k))}{\mathscr{F}_{non\text{-}structure}(\gamma(X_k))} = r^+(v)\left(\frac{(1-\beta)+}{\beta e^{-/+i4\pi vH}}\right)e^{-/+(i4\pi v\Delta z_{HCF})}$$

where $\mathscr{F}_{structure}(I(Z_k))_{SB}$ is a side band of the frequency transform of the structure intensity data and $\mathscr{F}_{non\text{-}structure}(I(Z_k))_{SB}$ is the corresponding side band of the frequency transform of the non-structure structure intensity data, $r^+_{ref}$ is the net electrical field reflectance of the non-structure surface and $+$ indicates the term or its conjugate.

6. Apparatus according to claim 1, wherein the structure provider is operable to relate the frequency transform ratio to a relationship representing the electric field in the image plane of an objective of the light director.

7. Apparatus according to claim 1, wherein the structure provider is operable to relate the frequency transform ratio to the relationship:

$$((1-\beta)+\beta e^{-/+i4\pi vH})e^{-/+(i4\pi v\Delta z_{HCF})}$$

where $\beta$ represents a ratio between the width and pitch of the surface structure elements, H represents the size of the surface structure elements in a direction transverse to the sample surface, v is the frequency of a nominal mean wavelength of light provided by the light director, and $\Delta Z_{HCF}$ is a surface height difference between the structure surface area and the non-structure surface area.

8. Apparatus according to claim 7, wherein the structure provider is operable to determine $\beta$ and H from an AC component of the frequency transform ratio and a DC offset of the frequency transform ratio.

9. Apparatus according to claim 1, wherein, in the event that there is no surface height difference between the structure surface sample area and the non-structure surface sample area, the structure provider is operable to relate the real part of the frequency transform ratio using the relationships:

$$1-\beta+\beta \cos 4\pi vH$$

$$-/+\beta \sin 4\pi vH$$

where $\beta$ represents a ratio between the width and pitch of the surface structure elements, H represents the size of the surface structure elements in a direction transverse to the sample surface.

10. Apparatus according to claim 1, wherein the structure provider is operable to determine the mean electric field from the frequency transform ratio for a plurality of surface pixels.

11. Apparatus according to claim 10, wherein the structure provider is operable to relate the mean electric field to:

$$\text{Re}(\bar{E}_k(v)/r(v))=1-\beta+\beta \cos 4\pi vH$$

$$\text{Im}(\bar{E}_k(v)/r(v))=+/-\beta \sin 4\pi vH.$$

12. Apparatus according to claim 1, wherein the structure provider is operable to determine the mean electric field from the frequency transform ratio for a plurality of surface pixels and to relate that mean electric field to the frequency ratio:

$$\bar{E}_k(v) = \frac{1}{N_x}$$

$$\sum_{j=1}^{N_x}\begin{pmatrix} \cos 4\pi v\begin{pmatrix}\Delta z_{structure} - \\ \Delta z_{non\text{-}structure}\end{pmatrix}_{jk} & +/-\sin 4\pi v\begin{pmatrix}\Delta z_{structure} - \\ \Delta z_{non\text{-}structure}\end{pmatrix}_{jk} \\ -/+\sin 4\pi v\begin{pmatrix}\Delta z_{structure} - \\ \Delta z_{non\text{-}structure}\end{pmatrix}_{jk} & \cos 4\pi v\begin{pmatrix}\Delta z_{structure} - \\ \Delta z_{non\text{-}structure}\end{pmatrix}_{jk}\end{pmatrix}$$

$$\begin{pmatrix}\text{Re}(HCF_j(v))\\-/+\text{Im}(HCF_j(v))\end{pmatrix}.$$

13. Apparatus according to claim 1, wherein in the event a width of the surface structure elements is comparable to a nominal mean wavelength $\lambda$ of the light provided by the light director or an aspect ratio of the surface structure elements is high, the structure provider is operable to modify the relationship by an absorption term.

14. Apparatus according to claim 13, wherein the absorption term is:

$$e^{-\alpha(v)H}$$

where a(v) is an absorption coefficient and H is the surface structure element size.

15. Apparatus according to claim 1, wherein in the event a width of the surface structure elements is comparable to a nominal mean wavelength λ of the light provided by the light director or an aspect ratio of the surface structure elements is high, the structure provider is operable to modify a term of the relationship involving the size by $$e^{-i4\pi vH}$$

where a(v) is an absorption coefficient and H is the surface structure element size.

16. Apparatus according to claim 1, wherein the structure provider is operable to use a fitting procedure to enable determination of values for at least one of said first and second structure measures.

17. Apparatus according to claim 1, further comprising a pitch provider operable to provide the pitch of the structure elements, wherein the structure provider is operable to determine a width for the structure elements using the provided pitch and the value for the first structure measure.

18. Apparatus according to claim 1, wherein the frequency transform ratio determiner is operable to determine the frequency ratio such that it is equivalent to a term having an amplitude component, a phase component and a helical phase component.

19. Apparatus according to claim 1, wherein the frequency transform ratio determiner is operable to use a Fourier transform to convert data into frequency space.

20. Apparatus according to claim 1, wherein the data processor is operable to average the series of intensity values resulting from measurement operations on a number of adjacent regions of the structure surface sample area to provide the structure intensity data.

21. Apparatus according to claim 1, wherein the data processor is operable to average the series of intensity values resulting from measurement operations on a number of regions of the non-structure surface sample area to provide the non-structure intensity data.

22. Apparatus according to claim 1, wherein the structure and non-structure sample areas are areas of the same sample.

23. Apparatus according to claim 1, wherein the structure and non-structure sample areas are areas of different samples.

24. Apparatus according to claim 1, wherein the non-structure intensity data also result from a measurement operation wherein the spread of light from the interferometer at the sample surface area is greater than a pitch of surface structure elements of the surface sample area.

25. Apparatus according to claim 1, wherein the electric field corresponding to the surface structure elements of the structure sample area is given by the following:

$$r(v)\text{psf}(x,y) \otimes \text{comb}(x/x_p) \otimes F(x,y)$$

where ⊗ represents a convolution, psf and comb are point spread and comb function, respectively, and F(x,y) is the topographic electric field.

26. A data processor for use in apparatus according to claim 1, the data processor comprising:
 a receiver operable to receive structure intensity data comprising a set of intensity values resulting from a measurement operation on a structure surface sample area using light having a point spread function with a spread at the sample surface greater than a pitch of surface structure elements providing the surface structure of the structure surface sample area, and to receive non-structure intensity data comprising a set of intensity values resulting from a measurement operation on a non-structure surface sample area not having the structure;
 a frequency transform ratio determiner operable to determine a frequency transform ratio corresponding to a ratio between the structure and non-structure intensity data; and
 a structure provider operable to relate the frequency transform ratio to a relationship involving a first structure measure representing a ratio between the width and pitch of the surface structure elements and a second structure measure representing the size of the surface structure elements in a direction transverse to the sample surface to determine values for said first and second structure measures.

27. Apparatus for determining surface structure element characteristics, wherein the apparatus comprises a coherence scanning interferometer and a data processor, the data processor comprising a structure determiner operable:
 to determine a frequency transform ratio relating to a ratio between structure intensity data and non-structure intensity data,
 the structure intensity data comprising a first series of intensity values resulting from a measurement operation by the coherence scanning interferometer on a surface structure sample area using a low numerical aperture objective such that the spread of light from a light source of the coherence scanning interferometer at the sample surface is greater than a pitch of surface structure elements of the surface structure sample area; and
 the non-structure intensity data comprising a second series of intensity values resulting from a measurement operation on a second sample surface area not having the surface structure;
 to relate the frequency transform ratio to a relationship representing the amplitude and phase of the electric field at the image plane of an objective of the interferometer in terms of a first structure measure representing a ratio between the width and pitch of the surface structure elements and a second structure measure representing the size of the surface structure elements in a direction transverse to the sample surface; and
 to determine values for at least one of said first and second structure measures as a result of relating the frequency transform ratio to the relationship.

28. Apparatus according to claim 27, wherein the structure determiner comprises a frequency transformer operable to determine first frequency transformed data corresponding to the structure intensity data and second frequency transformed data corresponding to the non-structure intensity data and a ratio determiner operable to determine the frequency transform ratio by dividing one of the first and second frequency transformed data by the other of the first and second frequency transformed data.

29. A method of determining information relating to a sample surface structure, the method comprising the steps of:
 carrying out respective measurement operations on a structure surface sample area having a surface structure comprising surface structure elements having a pitch and a non-structure surface sample area not having the surface structure by, at least for the measurement operation on the structure surface sample area, using light having a point spread function with a spread at the sample surface greater than the pitch of the surface structure elements and by, in each measurement operation, directing the light along a sample path towards a region of the sample surface and along a reference path towards a reference surface such that light reflected by the region of the sample surface and light reflected by the reference surface interfere, and causing relative movement along a measurement scan path between the sample and the reference surface while a sensing device senses light intensity representing interference fringes produced by the sample surface region at intervals during the relative movement to provide structure intensity data comprising a series of intensity values resulting from a measurement operation on the structure surface sample area and non-structure intensity data comprising a series of intensity values resulting from a measurement operation on the non-structure surface sample area;

determining a frequency transform ratio corresponding to a ratio between the structure and non-structure intensity data; and relating the frequency transform ratio to a relationship involving a first structure measure representing a ratio between the width and pitch of the surface structure elements and a second structure measure representing the size of the surface structure elements in a direction transverse to the sample surface to determine values for at least one of said first and second structure measures.

30. A method of manufacturing a product having a surface structure comprising surface structure elements having a pitch, which method comprises the steps of:

providing a design for a product having a surface structure; producing the product; and controlling at least one of the design and production in accordance with results of a method in accordance with claim 29.

31. A product manufactured by a method in accordance with claim 30.

32. A non-transitory computer readable storage medium carrying program instructions for programming processing means to carry out a method in accordance with claim 29.

33. Apparatus for determining information relating to a sample surface structure, the apparatus comprising:

light directing means for directing light along a sample path towards a region of a surface of a sample and along a reference path towards a reference surface such that light reflected by the region of the sample surface and light reflected by the reference surface interfere, the light directing means being operable to provide light having a point spread function with a spread at a sample surface greater than a pitch of surface structure elements providing a surface structure of the sample;

moving means for effecting relative movement along a measurement scan path between a sample and the reference surface;

sensing means for sensing light representing the interference fringes produced by a sample surface region during relative movement along the measurement scan path;

control means for carrying out a measurement operation by causing the moving means to effect relative movement while the sensing means senses light intensity at intervals to provide a series of intensity values representing interference fringes produced by a sample surface region during the relative movement; and data processing means for receiving and processing i) structure intensity data comprising a set of intensity values resulting from a measurement operation on a structure surface sample area using light having a point spread function with a spread at the sample surface greater than a pitch of surface structure elements providing the surface structure of the structure surface sample area, and ii) non-structure intensity data comprising a set of intensity values resulting from a measurement operation on a non-structure surface sample area not having the structure, the data processing means comprising:

frequency transform ratio determining means for determining a frequency transform ratio corresponding to a ratio between the structure and non-structure intensity data; and structure providing means for relating the frequency transform ratio to a relationship involving a first structure measure representing a ratio between the width and pitch of the surface structure elements and a second structure measure representing the size of the surface structure elements in a direction transverse to the sample surface to determine values for said first and second structure measures.

\* \* \* \* \*